United States Patent [19]

Ewing et al.

[11] 4,198,299

[45] Apr. 15, 1980

[54] MICROSCREEN METHOD AND APPARATUS

[75] Inventors: Lloyd Ewing, Milwaukee; Michael J. Bykowski, West Bend, both of Wis.

[73] Assignee: Water Pollution Control Corporation, Milwaukee, Wis.

[21] Appl. No.: 794,892

[22] Filed: May 9, 1977

Related U.S. Application Data

[63] Continuation-in-part of Ser. No. 567,337, Apr. 11, 1975, abandoned, which is a continuation-in-part of Ser. No. 427,600, Dec. 26, 1973, abandoned.

[51] Int. Cl.$^2$ .............................................. B01D 33/10
[52] U.S. Cl. ...................................... 210/77; 210/97; 210/161; 210/403
[58] Field of Search .................. 162/297, 369; 210/65, 210/394, 403, 77, 97, 161, 217, 297, 324, 326, 359, 402, 404

[56] References Cited

U.S. PATENT DOCUMENTS

| | | | |
|---|---|---|---|
| 3,485,378 | 12/1969 | Regel | 210/403 |
| 3,974,026 | 8/1976 | Emson et al. | 162/369 |
| 3,979,289 | 9/1976 | Bykowski et al. | 210/403 |

OTHER PUBLICATIONS

"Rotary-Gravity Type Screening Machines", Christman, *Industrial Water & Waste*, Nov.-Dec. 1962.

*Primary Examiner*—Frank Sever
*Attorney, Agent, or Firm*—Pollock, Vande Sande & Priddy

[57] ABSTRACT

Drop-back of solids into the drum pool of a rotary microscreen is reduced by applying a limited gas pressure differential across an unsubmerged portion of the screen cloth. The pressure is not for the purpose of increasing the driving force, ΔH, of the liquid passing through the cloth. For purposes of this disclosure, ΔH is the pressure differential existing across the screen below the surface of both the drum pool and tank pool. In fact, assuming other factors remain equal, application of a gas pressure differential to an unsubmerged portion of the screen cloth, with consequent reduction in drum pool suspended solids concentration, will normally reduce ΔH even though the gas pressure also acts on the surface of the drum pool. More significantly, the invention enables operation of a microscreen unit at increased flow capacity at a given ΔH. Whatever pressure is applied, there will be some reduction of torque, bearing load and wear at any given ΔH.

37 Claims, 18 Drawing Figures

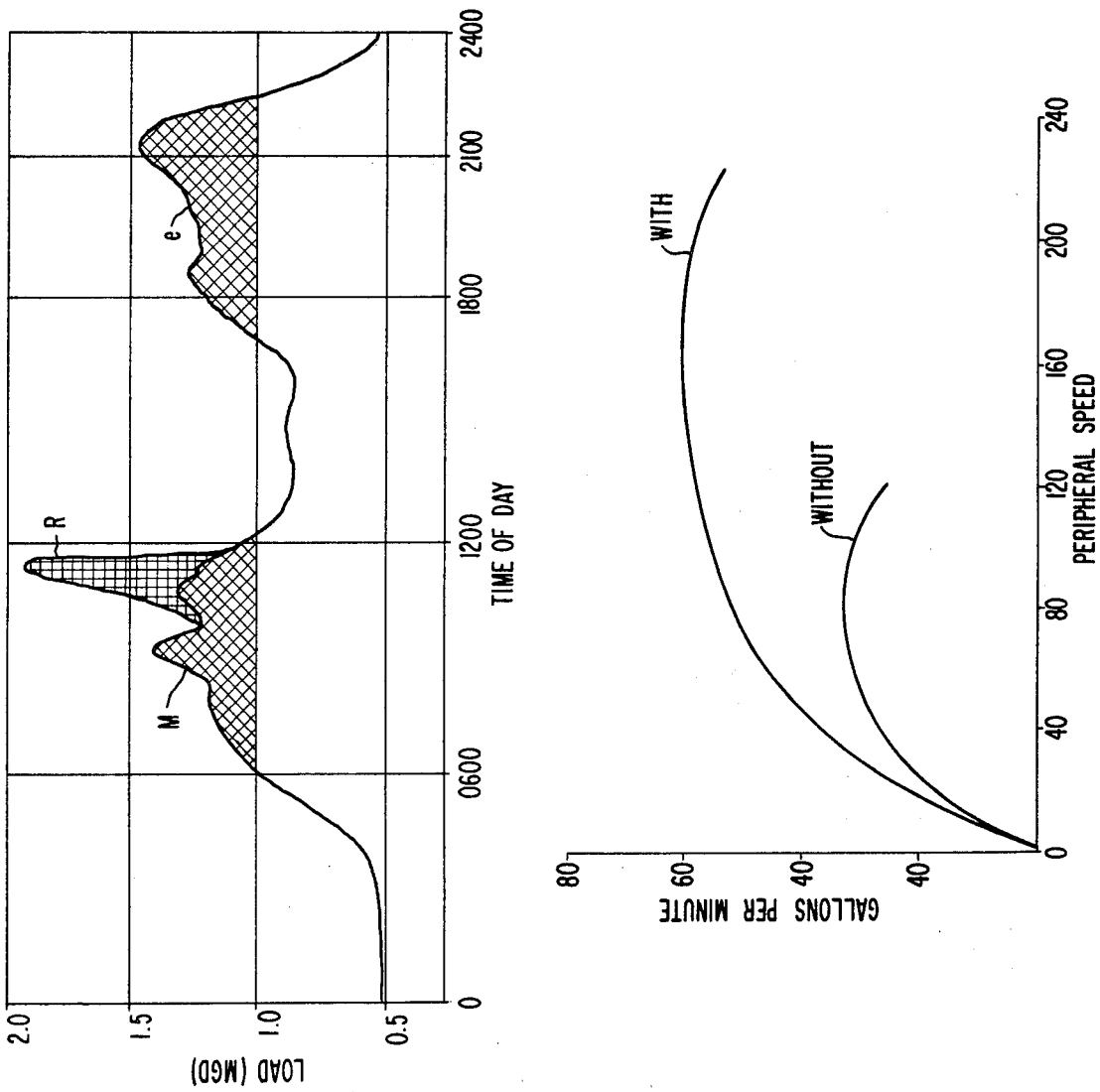
FIG. 9
FIG. 16
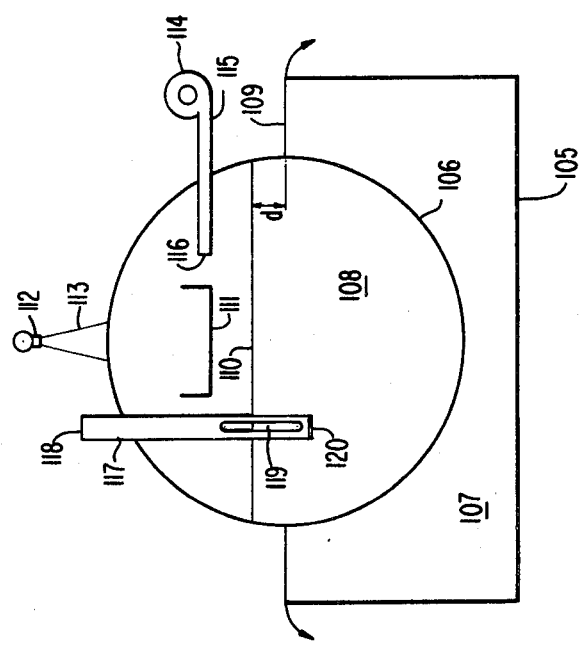
FIG. 10

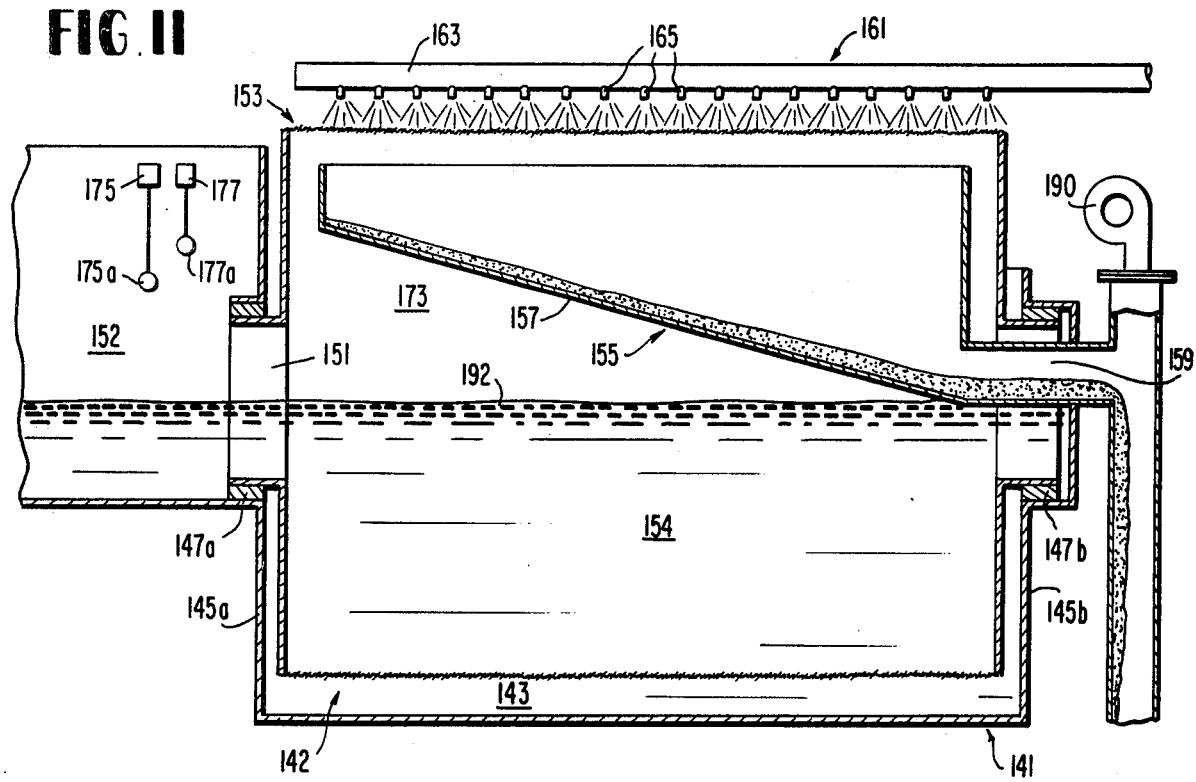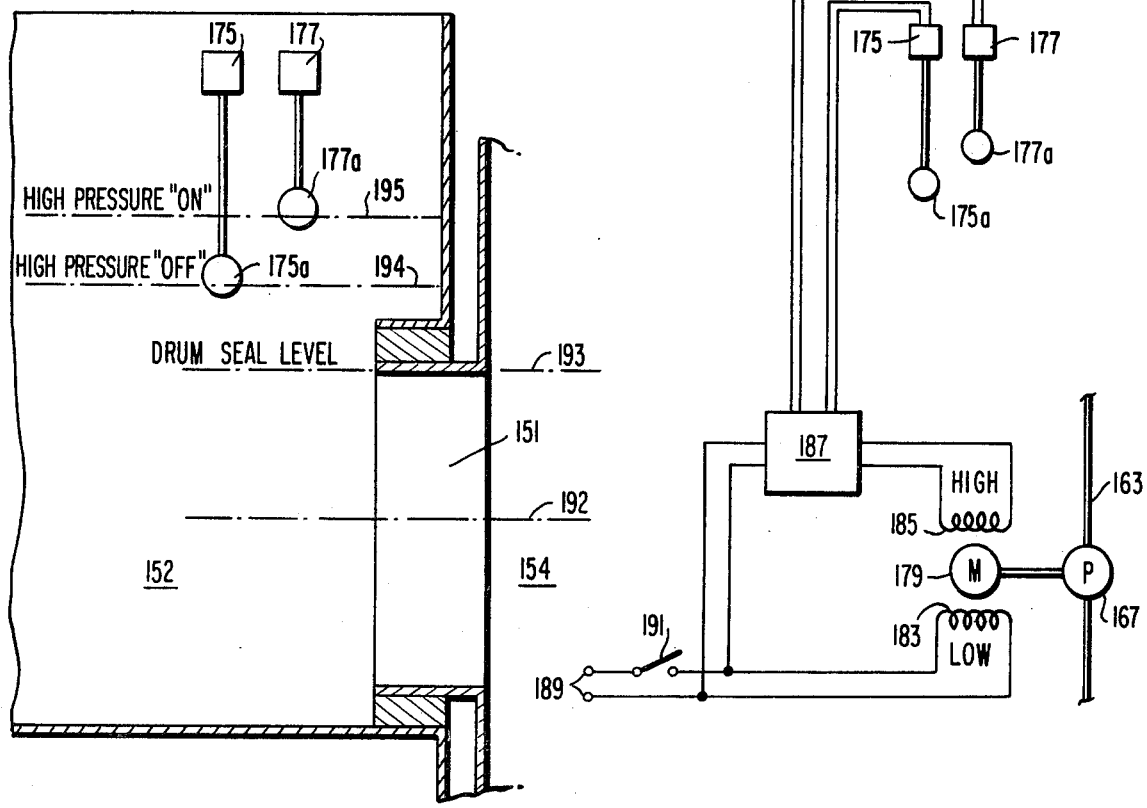

MICROSCREEN METHOD AND APPARATUS

CROSS REFERENCE TO RELATED APPLICATIONS

This application is a continuation-in-part of U.S. patent application Ser. No. 567,337, filed Apr. 11, 1975 (now abandoned), which was a continuation-in-part of U.S. patent application Ser. No. 427,600, filed Dec. 26, 1973 (also now abandoned).

BRIEF DESCRIPTION OF THE DRAWINGS

FIG. 9 is a graph illustrating load conditions of a domestic sewage plant to which the present invention may be responsive.

FIG. 10 is a schematic diagram of a control system for use in the present invention.

FIGS. 11 and 11a are sectional schematic diagrams of an additional embodiment of the invention.

FIG. 12 is a schematic diagram of a control circuit for the embodiment of FIGS. 11 and 11a.

FIG. 16 is a graph illustrating microscreen performance at varying drum speeds with and without the invention.

BACKGROUND OF THE INVENTION

The invention is directed to microscreening. Microscreening refers to separation of minute particles from dilute aqueous suspension in a rotary drum having micron-sized screening media (referred to as a screen), a spray arrangement for washing the screen, and a trough to catch liquids and solids displaced from the interior of the drum. The operation is conducted with a substantial percentage of "holes" in the screening medium "open" while the majority of the flow is occurring, e.g. there is free or unobstructed flow through the open holes. Microscreening is for example used in the final separation of microbiological bodies from extremely dilute suspensions, prior to discharge of the water to a water course.

To properly understand the present invention, one must carefully distinguish between microscreening and filtration in general. This sometimes proves difficult, as microscreening may on occasion be loosely referred to as filtering. This is due, perhaps, to certain similarities. In both filtering and microscreening there is separation of dispersed solids from a liquid, with periodic cleaning of the filtering or screening medium to remove the captured solids. However, there is a fundamental difference.

In filtration, the particle size and/or concentration and/or interval between cleanings are generally such as to build up and to maintain, during filtration, a multiparticle layer, e.g. one whose depth is at least several times the size of the average particle of dispersed material. This layer is often referred to as a "cake". As the interstices between the particles in the cake are generally of smaller dimensions than the holes in the filtration medium, the cake becomes, in essence, the filter. The more material which packs into the cake, the more difficult it is for small particles to escape through the filter.

Figure 1:
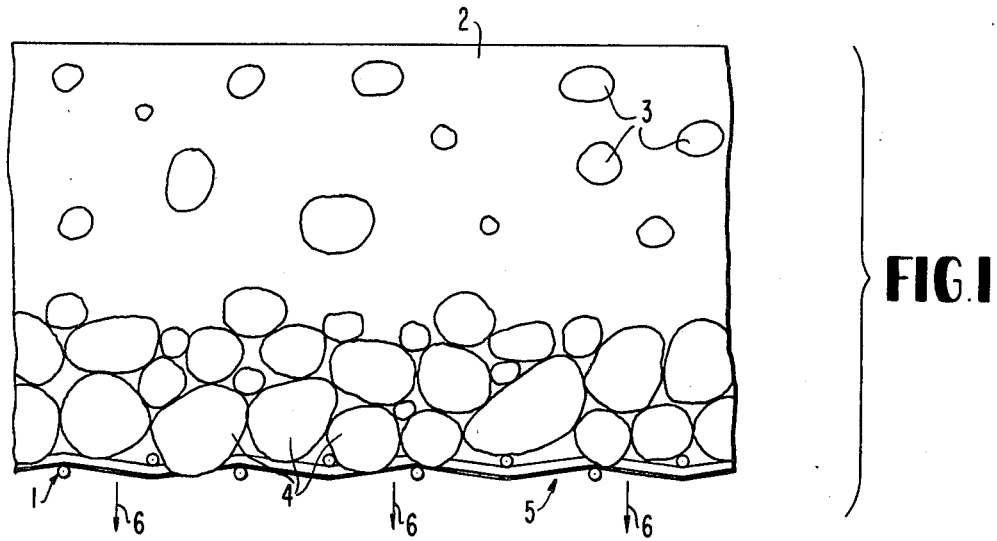
FIGS. 1 and 2 are schematic diagrams of liquid-solids separation media illustrating the difference between microscreening and filtering generally.

The foregoing is illustrated by FIG. 1, which shows a woven wire filtration medium 1, which is filtering a liquid 2. The diagram shows particles 3 of various sizes dispersed in the liquid, and many particles 4 of the same material which have become packed into layers or a "cake" on the filtering medium. The cake or layered particles 4 act as a filter to remove the particles 3 from liquid 2. In order that the layers of particles 4 may be the principal factor in filtering out suspended particles 3, the filtration operation is conducted so as to pass the majority of the liquid through after the multi-particle layer is in place on medium 1. Liquid which has been separated from the solids departs through the "clean" side 5 of the filter as indicated by arrows 6.

In filtering operations, with the object of enhancing the volume rate at which liquid can be handled without undue escape of small particles, filtration aids have been used. Also, the liquid 2 has been pressurized in the attempt to force it through the filter at a higher volume rate.

Figure 2:
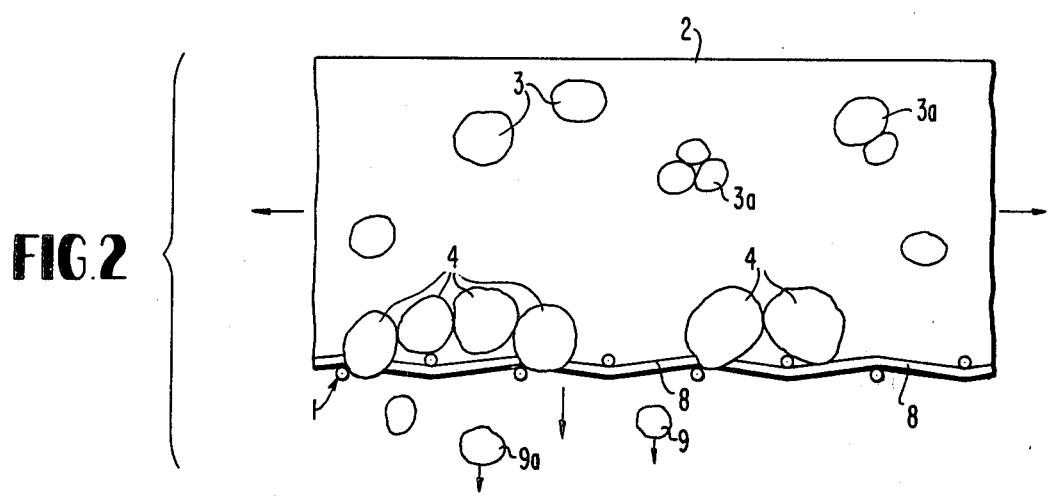

Microscreening is illustrated by FIG. 2. In microscreening, one provides such a large area of screen as compared to the amount of solids which are to be captured on that area between cleanings, that the majority of the liquid is processed through the screen before a cake has formed. The weight of solids (dry basis) captured on a given area of screen pass (between washings and ignoring any losses due to "drop-back" discussed hereinafter) is referred to as "solids loading". Loading levels indicative of screening as opposed to filtering are typically less than 0.5 mg/cm$^2$ but in the case of solids having favorable shape, density and other characteristics, may be as high as about 1 mg/cm$^2$. With relatively dense solids which have absorbed relatively little water, and when using screens in the upper end of the screen aperture range given below the solids loading may be up to about 2 mg/cm$^2$.

Thus, for instance, in the case of clarified biological sewage treatment plant effluent 2, there are minute particles 3 in suspension, some of which may be agglomerated particles 3a. The openings in the screening cloth 1 may be in the range of, for example, up to about 140 microns, the particular dimensions being selected to be smaller than the overall size of the majority of the agglomerates and discrete particles dispersed in the liquid. The microscreening influent may contain substantial percentages of discrete particles on the order of 10 microns or less in size and substantial percentages of agglomerates on the order of 50 microns and larger. The concentration of suspended solids in the influent may be, for example, 20 or more parts per million; and microscreening may, for example, reduce this concentration to 10 parts per million or less.

Because of the inordinately large volumes of liquid in relation to solid material in the influent, and notwithstanding the small sizes of the particles, it is impractical to form and maintain a "cake" to help capture the small particles and some particles 9 and 9a escape through the screen. Therefore, the problem of trying to force liquid through a cake at a high volume rate does not arise. In fact, before or shortly after all of the open holes 8 are blocked, the screening cloth is cleaned to remove particles 4 which have blocked the holes.

Figure 3A:
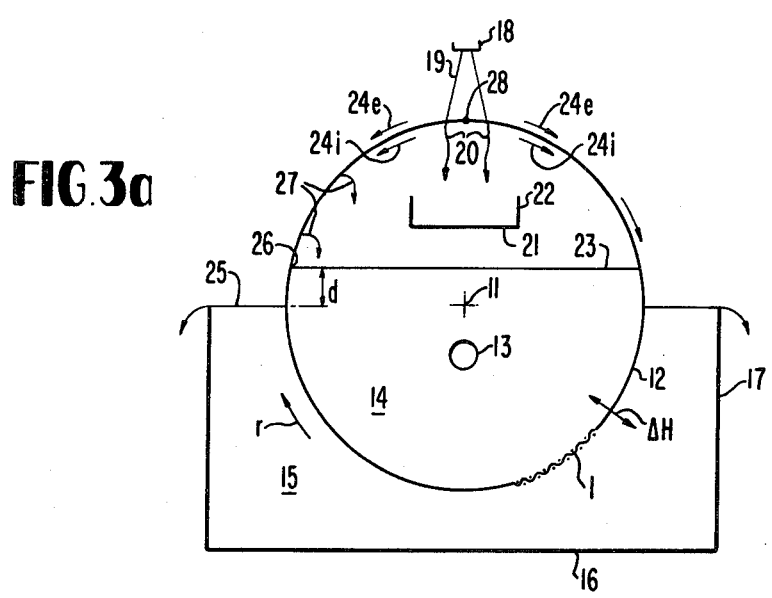
FIGS. 3a and 3b are sectional schematic diagrams of a microscreen unit illustrating the problem of drop-back.

FIG. 3a illustrates the conventional technique for cleaning the screening cloth and certain problems associated therewith. The figure shows a microscreen unit which has been cut open perpendicular to the axis of rotation 11 of its drum 12. Drum 12 is a liquid-solid separation device, substantially cylindrical, adapted to rotate on its horizontal axis 11 and having a screen cloth with, for example, openings in the range of up to 140 microns. The cloth is fitted so as to cover, generally, the entire peripheral surface of the drum, and the remaining areas of the peripheral surface and ends of the drum are sealed so that liquids may pass between the interior and exterior of the drum only through the cloth and such other inlets and outlets as have been specifically provided.

In general, the influent, that is the dilute aqueous suspension which is to be subjected to microscreening, enters the interior of the drum through any suitable inlet 13. Liquid flows from a drum pool 14 established inside the drum through the screening cloth 1 to a tank pool 15 in tank 16, leaving particles 4 deposited on the cloth 1, generally as shown in FIG. 2. Effluent liquid in tank pool 15 gathers in tank 16 and overflows the upper edge of side wall 17 or any suitable weir or other collection device. It is conventional to control the level 25 of the tank pool 15 to a predetermined level by appropriate adjustment of the collection device, which may include an automatic level control system (not shown). The level of the drum pool surface 23 differs from the level 25 of the liquid in tank 16 by a distance "d" which varies in accordance with the solids loading, drum speed, the size, shape and number per unit area of cloth openings, extent of agglomeration of the particles in suspension and other factors.

If one observes any given section of screening cloth 1 as it carries captured particles from near the bottom of tank 16 to the apex 28 of the circle in which the drum rotates, it will be seen that the screening cloth inverts. Thus, although the particles 4 (see FIG. 2) are above the screening cloth 1 when it is near the bottom of tank 16, these same particles are hanging on the underside of the cloth when the latter reaches apex 28 (as shown in FIG. 3a). Generally, these is sufficient adherence between the captured particles 4 and the cloth 1 so as to retain appreciable numbers of these particles on the cloth in the inverted position.

This makes it convenient to clean the screening cloth by a reverse-flushing technique. A nozzle 18, shown in FIG. 3a, is used to impinge a forcible stream 19 of water on the exterior surface of the cloth, normally at the apex 28. Portions 20 of this stream which penetrate cloth 1 dislodge the captured particles and carry them down into a subjacent trough 21 having side walls 22 above the surface 23 of the drum pool 14. The solids and wash water collected in trough 21 are removed through a suitable outlet (not shown). As the drawing shows, the drum pool level is maintained below the upper edges of trough side walls 22.

The capacity of conventional microscreen units is impaired, in part, by a problem referred to herein as "drop-back". As each successive portion of screening cloth 1 lifts clear from the surface 23 of the drum pool 14 at 26 some of the captured particles 4 stay in pool 14 or drop back into the pool as shown at 27. Since screening capacity is in part a function of the concentration of solids in the drum pool, the concentration increase resulting from this drop back reduces the screening The complete explanation of why drop back occurs in micro-screening—and how to solve it—were not widely understood in the art prior to the present invention, and the need for a simple and effective solution still exists.

Theory Regarding the Problem

The present invention was not thought of until after theories had been developed which were and are believed to define and explain the major causes to drop-back. These theories relate to velocity vector changes and to flows of water over portions of the screening cloth.

As a microscreen drum rotates, frictional effects between the screening cloth and drum pool cause or influence circulation of liquid in the drum pool. As a given portion of the screening cloth rises towards the surface of the drum pool, the water adjacent to the cloth generally follows the direction of motion of the cloth. That is, at a given instant in time, the cloth and adjacent water are moving in the same general direction. However, as the given portion of cloth emerges from the pool, in an upright or tilted attitude, the major portion of the accompanying liquid changes direction to follow the horizontal surface of the pool. That is, the velocity vector of the liquid accompanying the screen in the pool abruptly changes direction as the cloth emerges, so that the velocity vectors of the cloth and liquid suddenly become divergent. This abrupt change of direction, which successively affects the entire surface of the cloth, creates a disturbance, e.g. eddy currents, at the point of emergence. This disturbance, it is believed, tends to dislodge some captured or loosely held particles immediately and to weaken the adherence to the filter cloth of other captured particles, so that they drop back into the drum pool as the cloth inverts further, and prior to arriving at a position over the collecting trough.

Some of the water accompanying the given portion of filter cloth, as above described, apparently does not change velocity vector. Rather it remains with the cloth in the form of films, both on the inside and outside of the drum, as the cloth emerges. As the portion of cloth, now unsubmerged, continues upward, a downward flow relative to the moving screen develops in these films. The flow is believed to occur both on the inside and outside of the emerged portion of the drum and back through openings in the cloth. The flow on the outside is believed to dislodge or weaken the adherence of captured particles by contact with them through the holes which they obstruct. The portion of the exterior flow which enters the drum through the available holes is believed to join the interior flow. As portions of the thus augmented interior flow run down the inside of the cloth and/or drop directly to the drum pool, they also are believed to dislodge or weaken the adherence of captured particles.

Figure 3B:
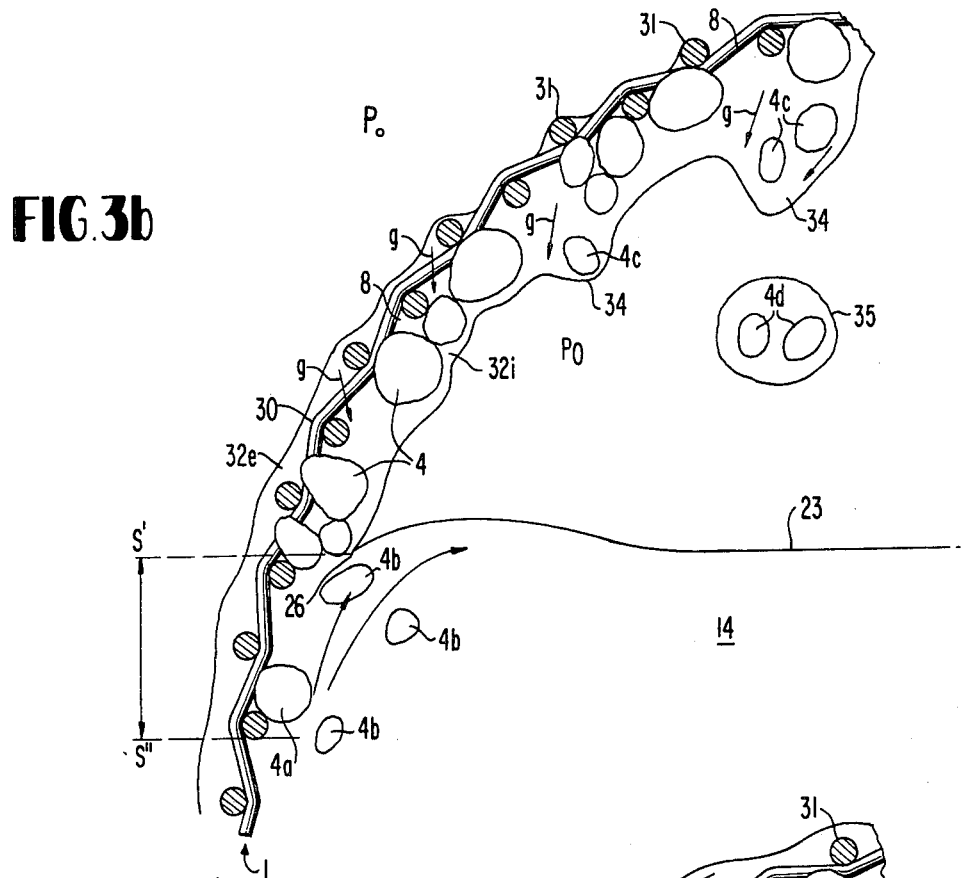

The foregoing is illustrated by FIGS. 3a and 3b. FIG. 3a shows screen cloth 1 rotating in the direction indicated by arrow r, toward the point 26 at which each successive portion of the cloth emerges or diverges from the drum pool 14. FIG. 3b is an enlarged portion of FIG. 3a in the vicinity of point 26. FIG. 3b shows the screen 1 as having warp threads 30 and weft threads 31, emerging from the drum pool surface 23 at point 26 $P_0$ indicates that the pressure conditions of the gas space within and surrounding the screen are commensurate with the pressure conditions ordinarily prevailing in conventional microscreen practice. In the region S'-S", the velocity vectors of the water film which emerges with the screen and of the water which remains in drum pool 14 diverge. The resultant currents "C" weaken the adherence of certain captured particles 4a and draw others 4b away from the screen. There is some tendency for hydraulic pressure in zone S'-S" to retain particles 4b against the screen 1, but this pressure diminishes to zero at S' and point 26 where divergence occurs.

The emerged portion of the screen 1 has many of its openings blocked by captured particles 4, but there may be unobstructed and partially obstructed openings 8, some of which are the result of drawing away of particles 4b. Films of water 32e and 32i are drawn upwardly with the screen as the drum rotates. Due to the progressively increasing inversion of a given portion of the cloth as it rises further from the drum pool 14, gravity causes exterior film 32e to flow over the sag through the screen as indicated by arrows "g", through open holes 8 and elsewhere. This flow back into the drum swells the interior film 32i at various places 34, and dislodges still other captured particles 4c. Where the flow creates droplets 35 which fall from the screen, these carry particles 4d with them back into drum pool 14 creating the capacity limiting concentration effect discussed above.

There is another source of exterior and interior flowing water films, which is illustrated by FIG. 3a. A portion of the back-flush water spray 19 does not go directly through the filter cloth. Rather, it flows down the exterior and interior of the filter cloth from the apex of rotation as indicated by arrows 24i and 24e. The flows 24i and 24e which are opposite to the direction of drum rotation are believed to be capable of dislodging or weakening the adherence of captured particles in much the same manner as the films 32i and 32e discussed in connection with FIG. 3a. However, when the peripheral speed of the drum is great enough, these opposite direction flows, with their accompanying contribution to the concentration of solids in the drum pool, apparently do not develop sufficiently to create a problem. Whether these opposite direction flows of shower water develop—or prove harmful—may also depend on shower placement.

SUMMARY OF THE INVENTION

A limited differential gas pressure is applied across an unsubmerged portion of the screening cloth of a microscreen unit, while rotating the drum, screening and backflushing. Thus, the invention is clearly distinguishable from pressure filtering techniques in which pressure is applied against the submerged area of a filter by pressurizing a confined body of liquid against a filter cake.

Thus, at least in respect to those unsubmerged portions of the screen where one wishes to improve captured particle adherence, one will provide a higher absolute gas pressure against the inside of the screen than against the outside of the screen. Thus, the pressure differential from the inside to the outside is positive.

The controlled pressure differential is preferably provided adjacent to the screen from the point of screen emergence 26 to a point where the screen is over a collection means such as trough 21. This can be done, for instance, by dividing the space above drum pool 14 so that at least a portion of the space which is between the aforementioned points (and in communication with the screen) can be maintained at a different pressure than the remainder of the space and applying the controlled pressure differential to said portion. But in microscreen units of the type depicted in FIG. 3a, wherein there is free communication of air throughout the air space above drum pool 14, such controlled pressure differential may be provided throughout that entire space.

Although the pressure differential may be applied in any desired manner, it can be applied very conveniently with a blower or pump having an outlet within the drum, preferably above the drum pool surface. However, if one encloses the exterior of the drum with a properly sealed housing, the differential pressure may be applied by a suction pump capable of reducing the pressure within the housing.

Pressure is not applied indiscriminantly. It is believed beneficial in preventing or reducing drop-back if one applies enough pressure to eliminate or retard entry of exteriorly flowing water films, e.g. films 32e of FIG. 3b and 24e (left side) of FIG. 3a, into the drum through screen 1. Preferably, the applied differential is limited for restricting the flow of the air from the space above the drum pool outwardly through the screen, but substantial quantities of air may escape, especially with higher pressures and larger media. In the usual case, the pressure differential is controlled at a level less than that required to break through the segments of water film or other liquid which are maintained by surface tension across unblocked or partially blocked openings in the cloth.

Thus, in accordance with the invention, one applies a pressure differential which is sufficient to substantially reduce the quantity of captured particles which are returned from the screen to the drum pool by the dropback problem discussed above. In this connection, pressure differentials in the range of about 0.1 to about 6.0 inches of water gauge and preferably about 0.1 to about 3 inches are typical when the invention is applied to conventional, commercially available microscreen units. However, operation in the range of from more than six to about 10 and above is also contemplated.

The invention provides advanced methods and apparatus which are of particular interest for dealing with agglomerated solids. These involve: applying the differential pressure only during periods of peak load on the microscreen, and/or boosting shower pressure during at least a substantial portion of the time during which the differential pressure is being applied and/or off-setting, inhibiting or preventing the application of the applied differential pressure in the zone above the collection means.

A number of advantages of the invention are described below. Among these are reduction of the concentration of solids in the drum pool with consequent increase in the throughput of the microscreen operation and apparatus.

Theory of the Invention

Figure 4:
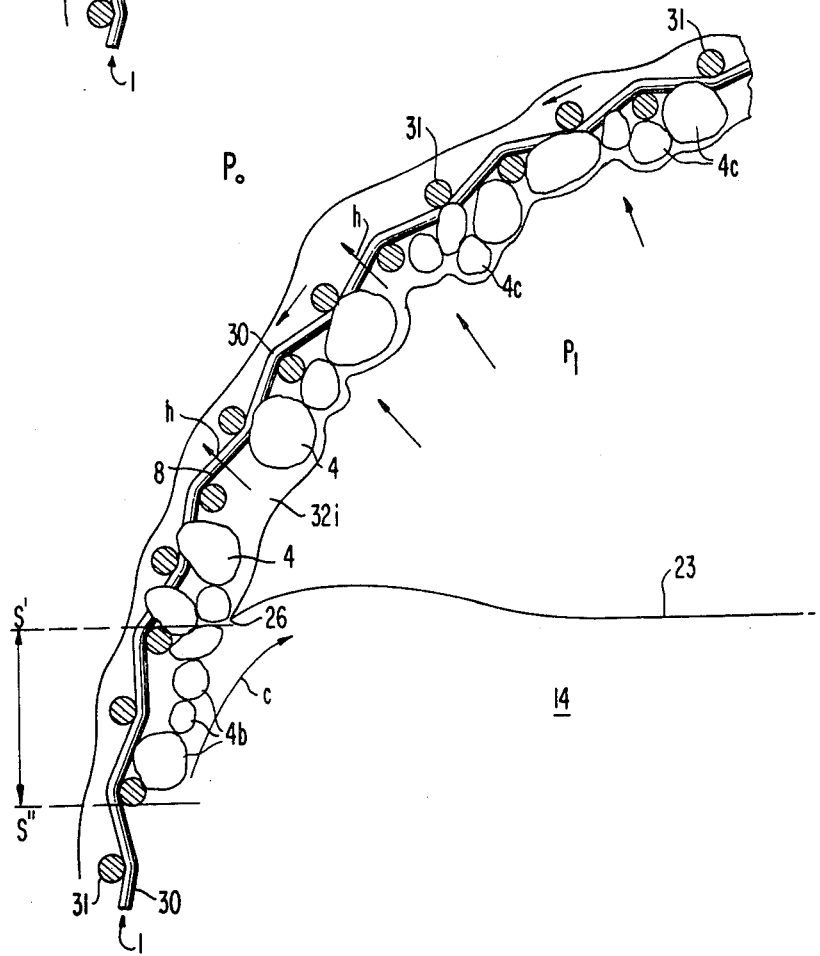
FIG. 4 is a schematic diagram of a section of the screen of a microscreen unit illustrating a theory of operation in respect of the present invention.

The theory of operation of the invention can be explained by comparison of FIGS. 3a, 3b and 4. The latter is similar to FIG. 3b and shows how application of a pressure differential in accordance with the invention is believed to alter the occurrences described in connection with FIG. 3b. Thus, as in FIG. 3b, FIG. 4 shows a screen 1 having warp threads 30 and weft threads 31 emerging from the drum pool surface 23 at point 26.

However in FIG. 4 the pressure $P_1$ within the gas space between the screen 1 and the drum pool surface 23 is larger than $P_0$.

In region S'–S'', where the hydraulic pressure formerly approached zero at S', the hydraulic pressure at S' is now augmented due to the pressure differential $P_1-P_0$ provided across the unsubmerged portion of the screen. This is true whether the drum pool surface 23 remains above the level of tank pool or is driven below the level of tank pool. The result of this augmentation is to provide added holding force to the captured particles in region S'–S''. This apparently increases the tendency for particles 4b which were formerly dislodged by currents c, to remain on the screen. Compare FIGS. 3b and 4.

The pressure may also reduce or eliminate the currents indicated by arrow g in FIG. 3b, or reverse their flow to the direction indicated by arrows h in FIG. 4. Although the emerged portion of screen 1 may still have unobstructed openings 8, the pressure differential $P_1-P_0$ prevents or retards sagging of the exterior film 32e through the screen 1.

Thus, more of the particles remain in place until they arrive over the collection trough (FIG. 3a), so they may be deposited therein by the back-flush spray. To the extent that this occurs, there are fewer particles dropping back into the drum pool, and the tendency towards development of excessive concentration in the drum pool is reduced.

In the practice of the invention, pressure is used in a different way to accomplish a different result as compared to conventional filtering techniques. Consider that in a microscreen unit $\Delta H$ is the liquid driving force across that portion of the screen which is at or below the level of both the tank pool and the drum pool. Structural, effluent quality and other considerations make this $\Delta H$ a limiting factor in determining unit throughput capacity. Application of differential pressure in accordance with the invention, which is accompanied by a resultant decrease in drum pool concentration, will actually reduce the $\Delta H$ or liquid driving force which is required to screen liquid at a given flow rate. Even more significantly, application of the invention makes more flow capacity available at a given $\Delta H$, other factors remaining equal.

SPECIFIC EMBODIMENT

Figure 5:
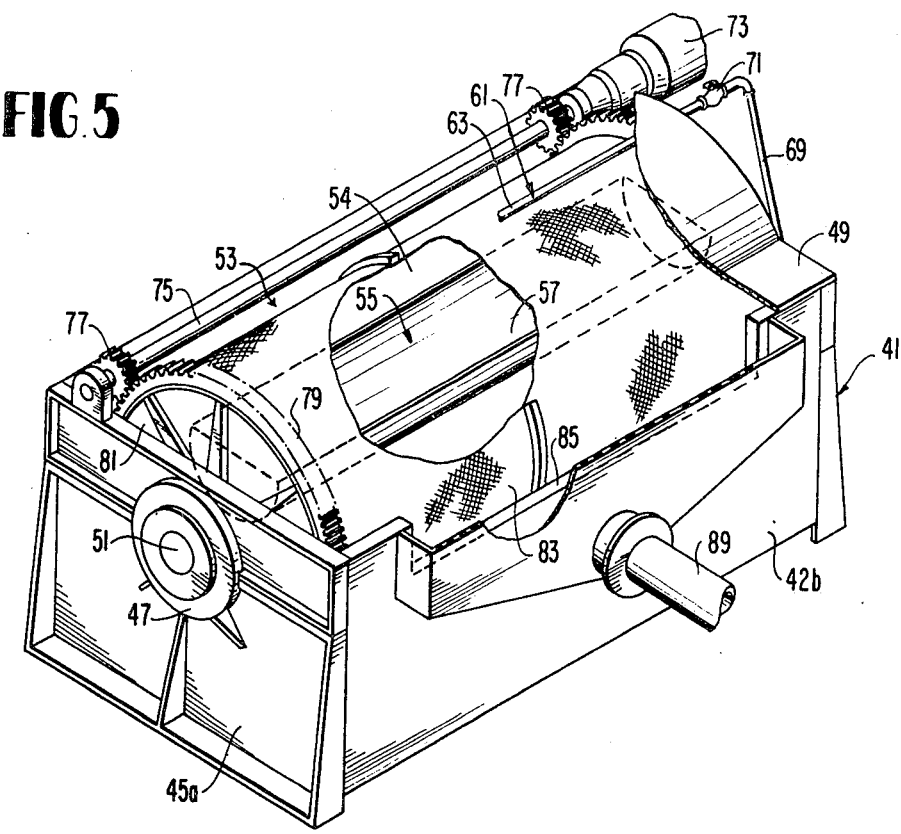
FIG. 5 is a perspective view, partially broken out, of a microscreen unit embodying the invention.
Figure 6:
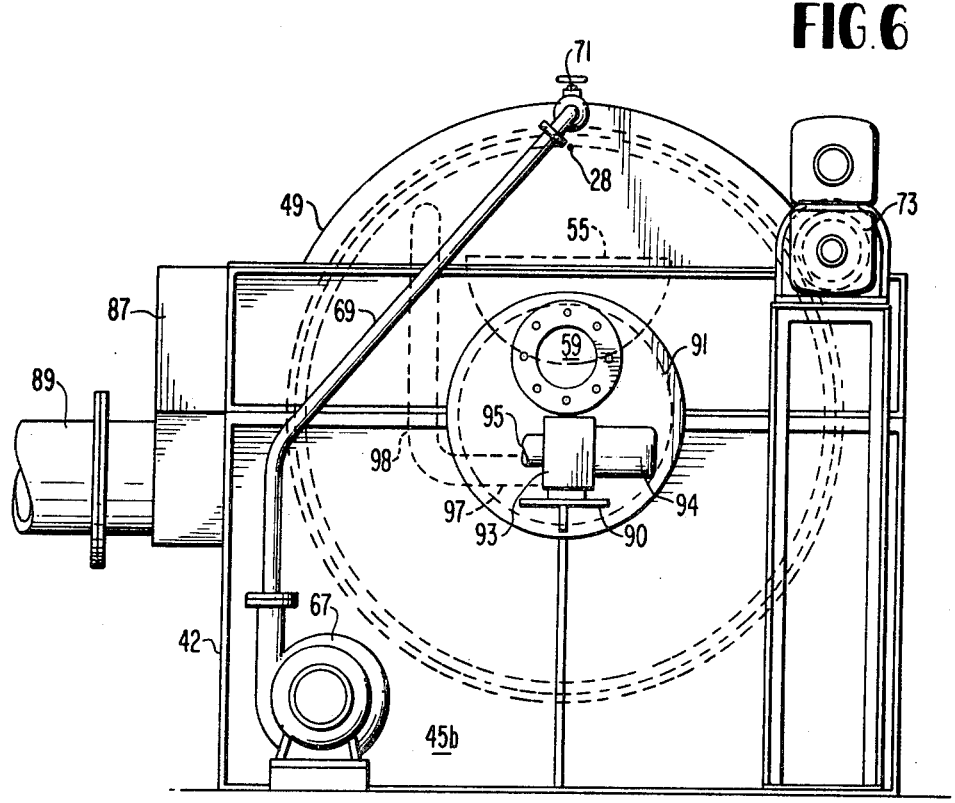
FIG. 6 is an end view of the microscreen unit of FIG. 5.
Figure 7:
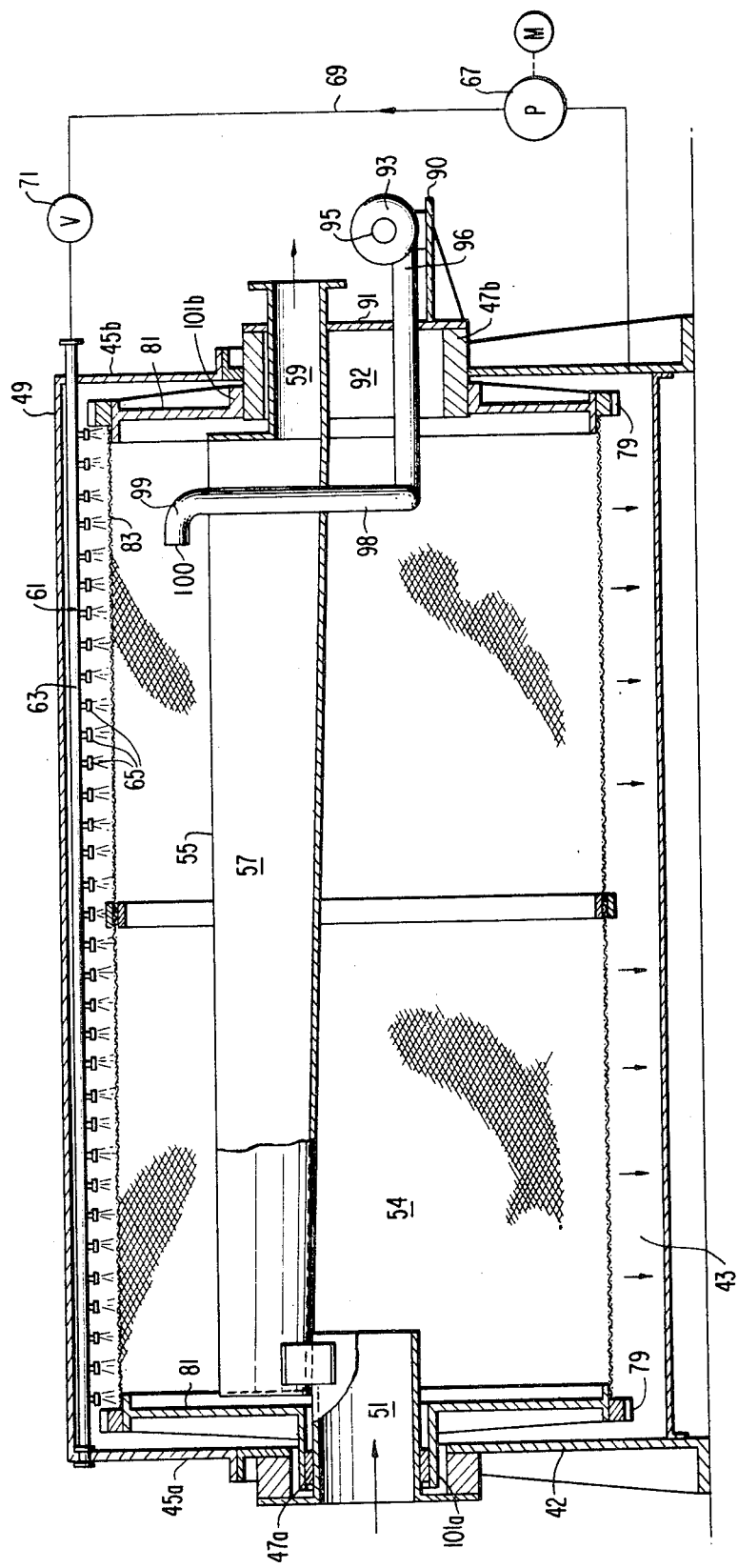
FIGS. 7 and 8 are side views, partially broken out, of the microscreen unit of FIG. 5 and a modification thereof.

Referring now to FIGS. 5–7 there is illustrated a microscreen unit 41 adapted for operation in accordance with this invention. Such a system generally comprises a tank or tub means 42 which forms in its internal portion a tank pool or reservoir 43 (FIG. 6). Located in end walls 45a and 45b of tank 42 and its hood 49 are annular drum axle bearing means 47a and 47b which form stationary retaining means about which the microscreen drum 53 (hereinafter described) may rotate. The hood or lid 49 is on top of tank 42 and may extend over the entire top portion of the system so as to prevent splattering of fluid and solids from within the system.

Located within the end wall 45a of tank 42 is inlet conduit 51 which communicates between a point external of the system and the drum pool zone 54. Located within drum 53, positioned longitudinally above its axis and directly below its highest point or apex of rotation, generally illustrated as at point 28 (see FIG. 6), is sludge collecting means 55. It includes a collecting trough 57 and a conduit 59 which connects the trough through the end wall 45b with a point external to the tank.

Located at about the apex of rotation 28 and internally of hood 49 are spray means 61. Spray means 61 may assure any conventional configuration which generally would comprise fluid conduit 63 and a plurality of axially spaced spray nozzles 65. While nozzles 65 may be any conventional nozzle currently employed in the art, it is particularly preferred to employ nozzles of the self-purging type such as those produced by Lodding Engineering Corporation of Auburn, Mass. Such nozzles are often known as "self-cleaning showers" and generally comprise a spring actuated plunger which closes down the orifice to form a spray when water pressure is applied behind the plunger. When water pressure is eliminated or reduced, such as by turning off the water, the plunger retracts and the nozzle opens thus purging it.

While back flush fluid (e.g. wash-water) may be provided by a source external to the system, it is preferred as illustrated in FIGS. 5–7 to supply this back flush fluid by means of a pump 67 which draws, for its source of fluid, from reservoir 43 and which then sends this fluid under pressure by way of conduit 69, fluid conduit 63 and nozzles 65 to the screen. In this respect, it is often convenient to provide a manual throttle valve 71 for manually adjusting the pressure to the nozzles 65.

For the purposes of this invention, pump 67 may be any conventional type such as a centrifugal pump. However, pump 67 is preferably capable of delivering back flush fluid to conduit 69 at two or more different pressures, one relatively lower than the other.

Filter drum 53 is rotatably driven by motor 73 which drives the drum 53 by way of rotating axle 75 linked to pinions 77 which are connectingly associated with gear wheels 79 on both ends 81 of drum 53.

While screen 83 may be of any conventional design, the preferred microscreen comprises a perforate supporting member, filter cloth of interwoven strands or filaments defining apertures therebetween, the apertures being smaller than the openings in the perforate supporting member, and a locking layer for locking the cloth in engagement with the supporting member. In addition, the locking layer is usually formed of solid material which, at least prior to locking, is soft or softenable under conditions which do not distend or impair the material of the filter cloth and the locking layer has an outer portion fixedly secured to the supporting member and having an inner portion which includes integral extensions extending through and at least partially overlapping a sufficient number of the filaments or strands of the cloth to securely lock the cloth to the perforate supporting member.

As best illustrated in FIG. 5 side wall 42b of tank 42 has therein a spill weir 85 for removing the filtered "purified" liquid from the system and sending it either to drain or to further processing. Such a spill weir communicates with a spill tank 87 and an outlet conduit 89.

In accordance with the invention, the microscreen unit of FIGS. 5–7 is provided with a shelf 90 mounted on the cover plate 91 which covers the central aperture 92 in annular drum axle bearing 47b. Secured upon shelf 90 is blower 93 having drive motor 94, inlet 95 and outlet duct 96. The duct extends via a watertight connection through cover plate 91 to a transverse offset pipe 97 which in turn connects with riser pipe 98, elbow 99 and outlet 100.

Drum 53 is structurally and operationally sealed against fluid flow at its ends by walls 81 and a watertight fit or packing at the joint between the drum axles 101a and 101b and the bearings 47a and 47b, respectively. In general, there is no direct communication between the interior of the drum and the surrounding atmosphere via drum inlet conduit 51 or sludge trough outlet conduit 59. This can be accomplished, for instance, by providing traps in these conduits. Moreover, the openings in the screen 83 are sufficiently small, and the tenacity of the water films which bridge these openings is great enough, so that a limited discharge of air from outlet 100 on operation of blower 93 will apply a positive pressure differential across screen 83 from the interior of the drum to the exterior.

This pressure differential is applied to the air above the water in the drum pool and is separate from the hydraulic head ΔH (FIG. 3a) which exists across the screen beneath the tank and drum pool surfaces. The output of the blower is preferably controlled to prevent escape of air through screen 83.

Figure 8:
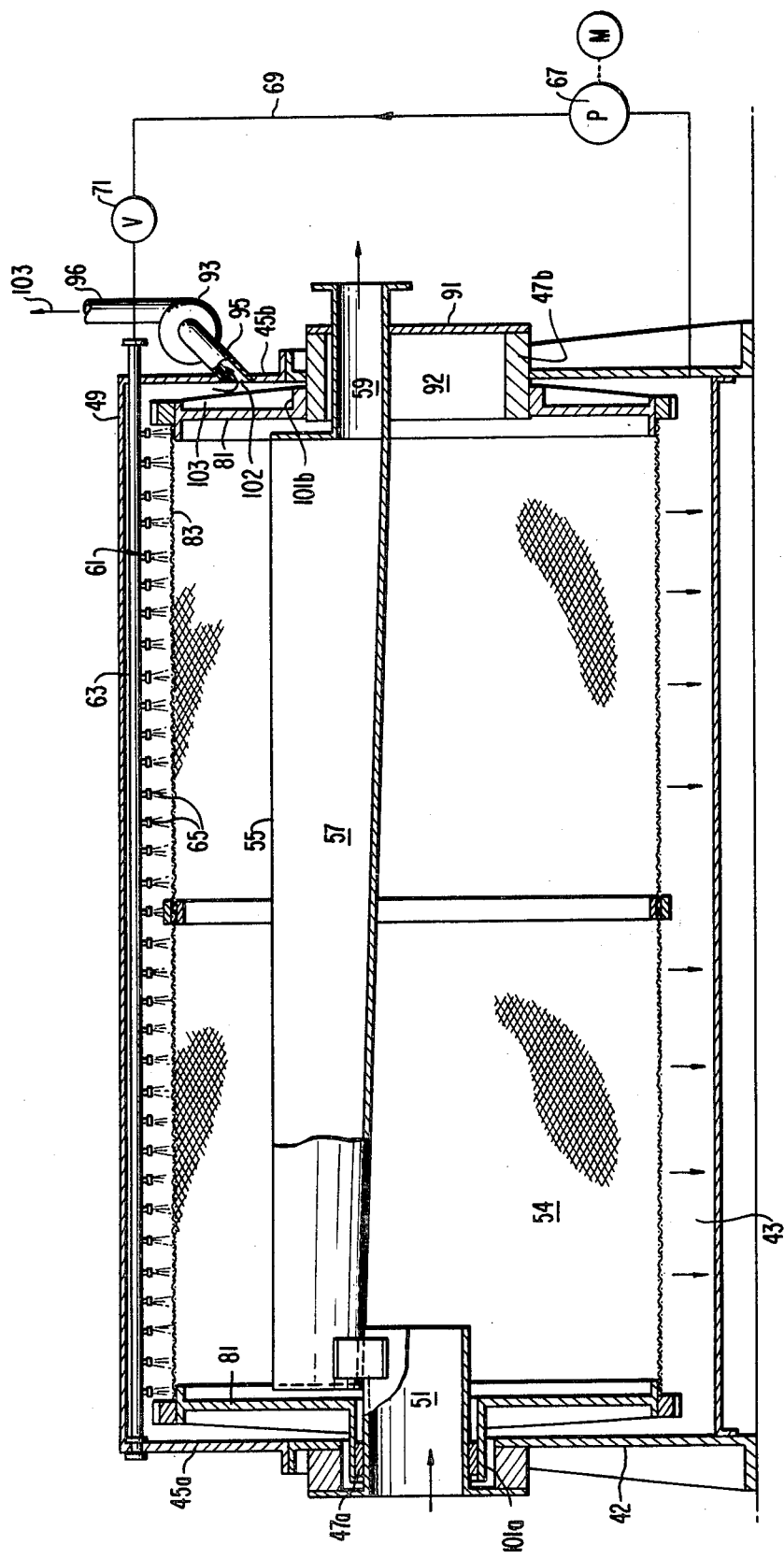

Alternatively, the positive pressure differential can be applied in the manner shown in FIG. 8, which is in many respects similar to FIG. 7, and in which like parts have like reference numerals. This embodiment also uses a blower 93, but in this case it functions to reduce the pressure in the space between the drum and its housing. Thus, blower 93 can be mounted upon end wall 45b with its inlet duct 95 communicating with the space between the outside of the drum and the microscreen unit hood through an aperture 102 in wall 45b. Operation of the blower causes air to follow the path indicated by arrows 103, thus reducing the pressure on the outside of the screen 83 relative to the pressure of the air within the drum gas space, which is vented to the atmosphere.

As can be seen by a comparison of FIGS. 7 and 8, use of blower 93 to generate suction (as shown in FIG. 8) reduces the amount of piping required, and generally simplifies the operation. On the other hand, it may necessitate sealing the ends 81 of the drum housing and the conduits, and creates the potential for corrosion of the blower by the mist from spray nozzles 65 which is present in the air drawn in through inlet duct 95. Thus, even though an adequately corrosion-proofed blower 93 may be available, the FIG. 7 embodiment in nevertheless preferred. Preferably, outlet 100 of FIG. 7 and inlet duct 95 of FIG. 8 are located above the highest expected water level.

The spray means 61 and collecting means 55 are features found in conventional microscreen units. They are usually designed with the object of passing the majority of the wash water from spray nozzles 65 directly through the cloth and into the collecting trough 57. However, in the operation of such conventional units, some of the wash water, and some of the solids which are loosened from the screen, do not reach the trough. Some of the water does not penetrate the screen, but rather forms an exterior film which clings to the exterior of the screen and eventually reaches the tank pool 43. Some of the water penetrates the screen but forms an interior film which clings to the interior of the screen and eventually reaches the drum pool 54. As each successive portion of the screen passes under the shower, solid particles clinging to the inside of the screen are loosened. Some of these are dislodged and carried into the trough by that portion of the shower water which reaches the trough. However, some of the solids loosened by the shower are not disengaged from the cloth and may become dispersed in the interior water film. Application of a differential pressure in the embodiment of FIGS. 5–7 may increase the quantity of water which does not penetrate the cloth and may also force a portion of the interior film to the exterior of the cloth. Such effect is acceptable in most cases, and particularly where the influent is substantially free of "agglomerated" solids. These are solids which are actually clusters of adherent particles which can be broken apart by the shower water, significant quantities of the separable particles being smaller than the screen openings. A flow of interior water film to the exterior of the drum can carry some of these smaller particles with it, resulting in a limited loss of screening efficiency. Screening efficiency is the percentage of influent suspended solids which is removed. Provided the quantity of such smaller particles is not too great, units constructed and operated in accordance with FIGS. 5–7 can collect a greater weight of solids per unit time than they could without the applied differential pressure. One might describe this situation in simplified fashion by saying that the increased throughput and solids removal are of greater importance than the loss in screening efficiency resulting from the presence of the smaller particles.

However, where the influent contains sufficient agglomerated solids to justify the effort, the screening efficiency of the microscreen units of the invention may be enhanced by one or more techniques described below with the aid of FIGS. 9 through 15. These techniques include applying the differential pressure only during periods of peak load on the microscreen, and/or by boosting shower pressure during at least a substantial portion of the time during which the differential pressure is being applied and/or by inhibiting, offsetting and/or preventing the application of the applied differential through successive portions of the screen as they pass through the shower.

Application of differential pressure only during peak load conditions provides very suitable design and operational advantages for microscreen units intended for municipal sewage plants. When a microscreen unit is provided with means to apply or increase the differential pressure during periods of peak load and eliminate or reduce the differential pressure during periods of reduced load, it reduces the amount of excess capacity (and therefore capital investment and operating cost) which may be designed into the microscreen unit to handle seldom or less frequently experienced peak loads. Consider for instance the hypothetical time vs. load graph of FIG. 9.

The base line of the graph is divided into hours in accordance with the twenty-four hour clock. The vertical axis registers the load imposed on a microscreen unit in units of millions of gallons of liquid input per 24 hour day (MGD). In the early morning hours, load is low. As more and more people arise, load increases. Operation of domestic clothes washers and other morning activities eventually produce a morning peak load, indicated by diagonally cross-hatched area "M" in FIG. 9. After an afternoon lull, there is an evening peak, indicated by diagonally cross-hatched area "e", followed by a lower level through midnight (2400 hours). Each plant has a characteristic pattern which may differ in detail from the hypothetical load curve in the graph, but in the absence of precipitation the same general pattern normally repeats from day to day. However, a sudden heavy rainstorm can produce an unusually high peak indicated by horizontally and vertically hatched area R, especially where there have been a substantial number of legal or illegal connections of roof downspouts into the sewage system, or where the sewer line joints inadequately bar infiltration of ground water.

In general it has been most common practice to design sewage treatment plants with sufficient capacity to handle the highest peaks in the usual diurnal flow to the plant. In designing a plant based on this criterion to handle the load depicted in FIG. 9, one would perhaps design for 1.5 MGD. This means that during much if not most of the day the plant operates well below its design capacity. By application of the present invention to a conventional microscreen, it is not unreasonable to expect a one and a half to two fold increase in available capacity without proportionally increasing unit costs. Thus, a microscreen unit with an effective area and cost approximately consistent with a 1 MGD load can serve the load depicted in the graph. Assuming the influent contains sufficient agglomerated solids to justify it, the system may be equipped with automatic controls to provide the applied differential pressure only when the plant is operating at peak loads indicated by hatched areas M, R and e. Thus, when the load is below a 1 MGD rate, the applied differential pressure may be eliminated and the plant will operate at maximum screening efficiency. The overall operation, considered on a daily average basis, can provide an overall acceptable effluent quality.

Moreover, as illustrated by the rain peak R, a 1.5 MGD conventional plant could occasionally suffer peak loads in excess of capacity, resulting in by-passing of unscreened waste water to a river or lake. The chances for such an occurrence are reduced by a microscreen unit in accordance with the invention, as it has, at a very reasonable level of capital investment, a considerable lattitude in operating capacity. Thus, even where one is applying maximum differential pressure to handle maximum load, resulting in some loss of screening efficiency, the over-all results will be better than if it had been necessary to by-pass the filter and send unfiltered solids to the river or lake.

A unit of the type referred to in the preceding discussion is shown in FIG. 10. FIG. 10 depicts schematically a microscreen tank 105, fitted with rotatable drum 106. The tank confines a tank pool 107 having a surface 109 while the drum contains, for screening, a drum pool 108 having a surface 110 which is higher than the surface 109 by a distance d. As previously described, the drum screen is washed by spray 113 from nozzle 112, and wash water and solids are collected by subjacent trough 111. Differential pressure is provided by blower 114 having discharge duct 115 and an outlet 116 to the air space within the drum 106 above drum pool 108.

The control system includes means responsive to one or more indicators of load (influent solids concentration and/or volume rate of influent liquid). They may for instance take the form of a vent pipe 117 having a closed end 120, an entrance orifice 119 and an outlet to the atmosphere 118. The effective area of the entrance orifice 119 is controlled by the surface 110 of the drum pool 108 thus causing a greater pressure drop across the orifice 119 upon a rising level of surface 110. This increased pressure drop results in an increase in the pressure in the air space within the drum 106. The blower 114 is chosen so that it has a cutoff pressure equal to the maximum pressure desired when the surface 110 has risen to completely block the entrance orifice 119 of vent pipe 117. As the liquid level 110 in drum pool 108 is affected by load, generally rising in response to increased load, and this same level increase will increase the pressure drop across orifice 119, increasing the differential gas pressure across the unsubmerged portion of the screen, the system continuously increases and decreases the applied pressure differential in response to increasing and decreasing load. Thus, extra capacity is provided when it is needed most, and when the load is relatively low, the applied pressure differential is reduced or eliminated.

Many other types of control systems may be applied to regulating the amount of differential pressure in relation to system load. This may for instance take the form of a tank pool level sensor having a float and a float arm which follows the tank pool level and establishes an electric signal representative thereof. This sensor may connect to a controller via an appropriate circuit. The controller may be any device capable of controlling the applied pressure differential, such as by regulating the blower 114 in a variable speed and/or on-off mode to vary or commence and discontinue application of the applied pressure differential between the inside and outside of the drum. The controller may receive line current via an appropriate circuit and feed current to the blower via another circuit.

The blower may be maintained at low speed or off at lower liquid levels, the blower being energized or speeded up to commence or increase application of the differential pressure as liquid level rises. On the other hand, the controller could actuate a pressure regulating valve on the inlet or discharge side of a constant speed blower 114 in an open-closed, stepped flow or infinitely variable flow mode to control the applied differential pressure.

The foregoing are only a few examples of how the applied differential pressure is reduced (including elimination thereof) at or in response to lower operating loads and increased (including being turned "on") at or in response to higher operating loads. Also the operation of blower 114 may be controlled in response to other factors indicative of load, such as for instance, influent volume flow rate or suspended solids concentration, viscosity of the slurry discharged from the collecting trough, effluent ("clean water") suspended solids concentration, and the like.

A particularly preferred control system, depicted in FIGS. 11, 11a and 12, also embodies application of differential pressure only during periods of increased load. This is combined with operating the shower at increased pressure during at least a substantial portion of the time when differential pressure is applied, and operating the shower at decreased pressure during at least a substantial portion of the time when differential pressure is not applied. However, periodic boosting of shower pressure may also be practiced for other purposes, such as to occasionally provide more thorough cleaning of the screen. Thus, boosting of shower pressure may be practiced irrespective of whether differential pressure is applied continuously or discontinuously.

FIGS. 11 and 11a illustrate a microscreen unit 141 having tank or tub means 142, tank pool or reservoir 143 with end walls 145a and 145b and annular drum axle bearing means 147a and 147b. In tank 142 is rotatably mounted microscreen drum 153. Means (not shown) are provided for rotating the drum. As in prior embodiments, there are a spill weir, spill tank and outlet conduit (not shown) to handle over-flow of "clean" water from tank 142 (not shown).

One of the annular axles of drum 53 extends through end wall 145a of tank 142 forming a conduit 151. It communicates between a head box 152 and drum pool zone 154. The top of head box 152 is open to the atmosphere. Supported and suspended within head box 152 is a pair of switches 175 and 177. Through suitable actuating arms these switches are connected respectively with floats 175a and 177a. The floats hang at two different elevations above the top of conduit 151 and in position for floating upwardly on any water which may be rising in head box 152 above the top of conduit 151, thereby operating switches 175 and 177.

Within drum 153 is sludge collecting means 155 with collecting trough 157 and a conduit 159 which connects the trough through end wall 145b with a sludge disposal point with a seal, e.g. a trap, (not shown) outside the system. A blower 190 has its outlet connected with conduit 159. As this conduit is only partly full in normal operation, the outlet of the blower is in communication with the gas space 173 above the drum pool or reservoir 154 through the airspace in the conduit and the open top of trough 157. Blower 190 operates whenever the microscreen is working.

As in previous embodiments, there are spray means 161, which may include, for instance, a conduit 163, nozzles 165, and a pump 167 (FIG. 12). This pump may be of any type which is capable of delivering back flush fluid to conduit 163 at two or more different pressures. Thus, for instance, the motor 179 may be provided with low speed windings 183 and high speed windings 185. For example, one might choose a pump and motor combination which, in conjunction with other system characteristics, would produce shower pressures of 30 psi and 120 psi respectively.

FIG. 12 is merely an example of the type of circuitry which may be employed in conjunction with other systems elements for boosting shower pressure during at least a portion of the time when differential gas pressure is being applied across unsubmerged portions of the screen. Thus, for instance, low speed windings 183 may be connected through a master switch 191 with a source of line current 189 so that they are energized at all times when master switch 191 is in the on position. A controller 187, connected to the line through the same main switch, can be used to control high speed windings 185 with the assistance of the switches 175 and 177 in the head box 152.

Although one of the switches 175 or 177 would suffice to control high speed windings 185, certain advantages may be obtained by using two switches. For instance, the controller may include appropriate relay circuitry so that windings 185 will be energized by the raising of float 177a and de-energized by the descent of float 175a. This avoids unwanted "on-off" cycling of the high speed windings, a problem sometimes experienced with single switch controls.

In the operation of this embodiment, the drum pool 154 has a certain level 192 (see FIGS. 11 and 11a) which may be characterized as low level operation. With the level of water in the head box 152 and drum pool 154 at level 192, conduit 151 is partially open. Thus, the gas space 173 of drum pool 154 is in communication with the atmosphere through the open top of head box 152. An increase in load, e.g. influent flow and/or influent suspended solids concentration, will force an increase in liquid level 192. If the load increase is sufficient so that the liquid rises to level 193, the liquid will close conduit 151. The air delivered by blower 190 through conduit 159 and the open top of trough 157, which formerly escaped through conduit 151, when it was partially open, now pressurizes gas space 173.

If the load increases still further, there can be still further increases in the liquid level to levels 194 and 195. When the liquid level reaches 195 in head box 152, thus raising float 177a, switch 177 will energize high speed windings 185 through controller 187. This, in turn, will increase the shower pressure from a first level of 30 psi to a second and higher level of 120 psi. The increase or boost in shower pressure is of assistance in recovering more of the solids which the screen transports to the shower zone. This is accomplished both through more thorough cleaning of the screen and more complete recovery of shower water in the collection trough. With this further improvement, the drum solids concentration is reduced, diminishing $\Delta H$, enabling the unit to handle an even larger liquid flow, while maintaining reasonable concentrations of suspended solids in the effluent. When load decreases to level 194, float 175a actuates switch 175 and controller 189 to de-energize high speed windings 183. Shower pressure returns to 30 psi. Further decreases in load—which cause the liquid level to drop below level 193, unseal conduit 151, open the drum gas space 173 to the atmosphere, and eliminate the pressure differential—return the unit to low level operation.

Figure 13:
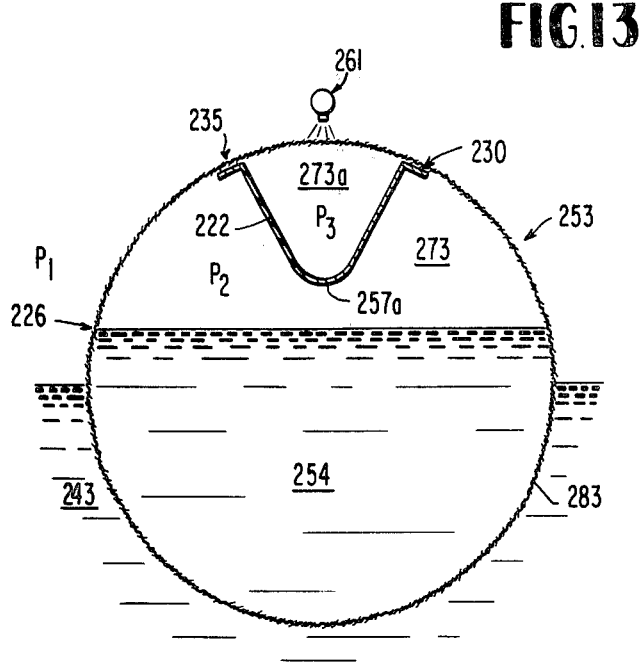
FIGS. 13, 14 and 15 are sectional schematic diagrams of three additional embodiments of the invention.
Figure 14:
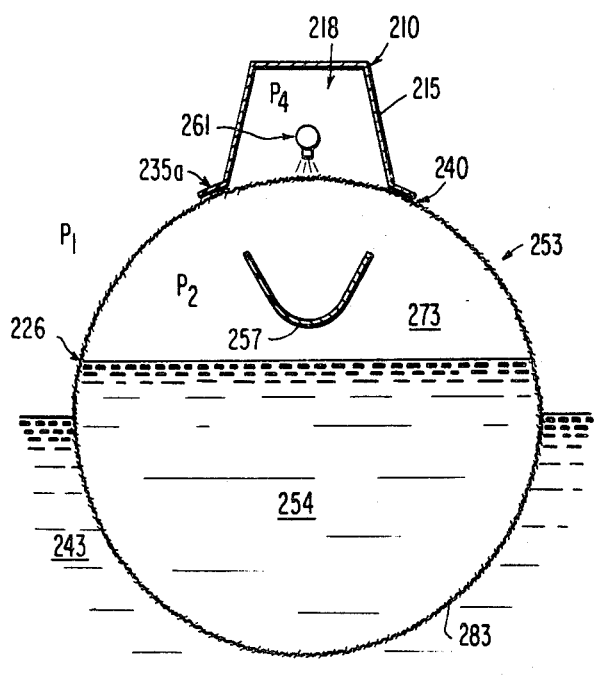
Figure 15:
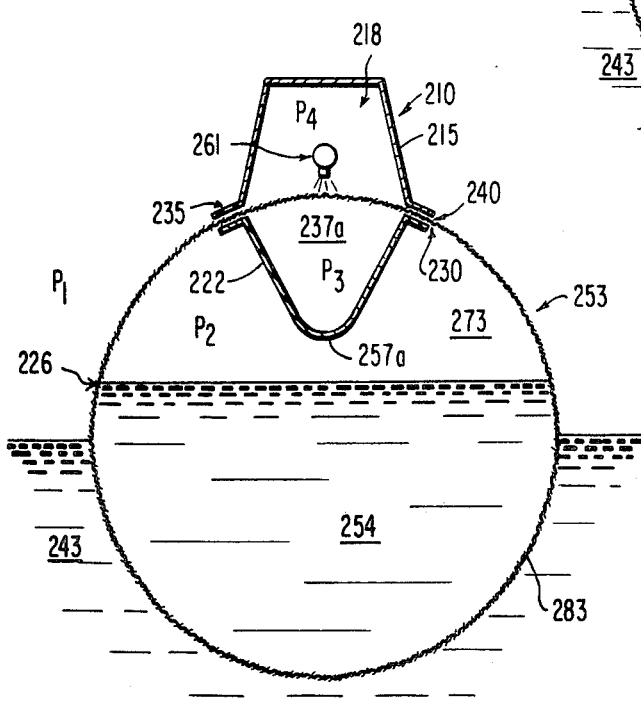

The techniques of and apparatus for inhibiting, offsetting and/or preventing the application of differential pressure through successive portions of the screen as they pass through the shower are illustrated by FIGS. 13-15. The purpose of these embodiments is to apply differential pressure where it is needed, while reducing, eliminating or even reversing the differential pressure where it is not needed, e.g. across successive portions of the screen passing between the spray means and the trough.

In general, these embodiments involve providing a zone or enclosure in and adjacent to the screening medium. This zone or enclosure is open to and defines a region of the screening medium which is traversed by the back flush fluid. The enclosure is connected with means for controlling the pressure in said region, for maintaining the pressure outside the screening medium relatively greater than or equal to the pressure inside the medium. A very simple example would include an enclosure formed by extending the sides of the solids collection trough upwardly until they almost touched the inner surface of the screening medium and connecting the resultant enclosure to the inlet of the blower which applies the pressure differential in the remainder of the gas space above the drum pool. This is an example of apparatus in which the enclosure is at least partly pressure independent from the gas space and is connected with means for maintaining the enclosure at a pressure which is relatively lower than the pressure in the gas space. However, the enclosure need not be pressure independent from the gas space in the drum. For instance, the enclosure may be in the form of a hood outside the drum which surrounds and encloses the back flush spray means, has sidewalls which extend downwardly to where they nearly touch the peripheral surface of the screening medium, and has an interior which is open to the screening medium. Such hood may be connected by a simple conduit to the gas space above the drum pool, for equalizing the pressures in the hood and the gas space. Alternatively, the aforementioned conduit may be omitted, and the outlet of a second blower, separate from the one which generates the differential pressure applied within the drum, may be connected to the hood. Thus, the preceding two embodiments are examples of apparatus in which the enclosure is at least partly pressure independent from the atmosphere surrounding the drum, and is connected with means for maintaining the enclosure at a relatively higher pressure than the atmosphere surrounding the drum.

Once the concept is understood, different embodiments can be formulated by those skilled in the art. However, for simplified illustration and discussion, and to provide a showing of their preferred form, the microscreen units of FIG. 13-15 are each individually identical to the embodiment of FIGS. 5-7, except as otherwise shown and described.

FIGS. 13-15 disclose the rotary drums 253, screens 283, drum pools 254, drum gas spaces 273, tank pools 243 and spray means 261 of three microscreen units which are alike in all respects, except in respect to certain modified collection troughs and hood arrangements discussed below. Although not shown in FIGS. 13-15, these three embodiments also include the same kind of tank, drum axle bearings, inlet conduit, sludge outlet conduit, nozzles, back flush fluid pump, drum driving means, spill weir, spill tank, "purified" liquid outlet conduit, differential pressure blower, associated pipes and ducts for the blower, and sealing means disclosed in FIGS. 5-7 and the accompanying description.

As shown in FIG. 13, one may provide a pressure independent zone 273a between the inside of screen 283 and trough 257a by extending the trough side walls 222 and ends (not shown) upwardly until they touch or nearly touch the screen. Provided the space 230 between the edges of the trough and the inner surface of screen 283 is narrow enough, there will be a sufficient pressure drop across this space to make the trough zone 273a at least partially pressure independent from drum pool gas space 273.

In this embodiment, as in FIGS. 14 and 15, the prevailing pressure conditions outside the drum are represented by $P_1$; in these three Figures the pressure conditions in the drum gas space between the point 226, at which screen 283 emerges from drum pool 254, and the point 235, at which it passes over the edge of collection trough 257a, is represented by $P_2$; and, in FIGS. 13 and 15, where there is an at least partially pressure independent zone 273a for the trough, the pressure conditions therein are represented by $P_3$.

The appropriate pressure conditions for the embodiment of FIG. 13 are given by the expression: $P_2 > P_1$ and $P_3 < P_2$. However, preferably: $P_2 > P_1 \geq P_3$. The pressure $P_3$ in zone 273a can be provided in any suitable way. Where it is feasible to provide a sufficiently close fit between the trough edges and the inner surface of screen 283, $P_3$ may be maintained at less than $P_2$ by venting zone 273a to the atmosphere or other zone of reduced pressure relative to $P_2$; or, if desired, the inlet of the blower which pressurizes zone 273 may be connected to the zone 273a to exhaust air therefrom. With blowers of substantial capacity, relatively large spacings between screen 283 and trough sidewalls 222 are permissible.

As shown in FIG. 14, there may be free communication between the interior of trough 257 and the remainder of the drum pool gas space 273. In such case, the unit may be provided with a hood 210 over spray means 261. One may provide a pressure independent zone 218 in hood 210 between the outside of screen 283 and spray means 261 by extending the hood sidewalls 215 and ends (not shown) downwardly until they nearly touch the screen. When the space 240 is sufficiently narrow, it will provide a sufficient pressure drop to make the hood zone 218 at least partially independent from the remainder of the gas space surrounding the drum, in which pressure $P_1$ prevails.

In this embodiment, as in FIG. 15, the pressure conditions prevailing in the hood zone 218 are represented by $P_4$. The appropriate pressure conditions for the embodiment of FIG. 14 are given by the expression: $P_4 > P_1$ and $P_2 > P_1$. However, preferably: $P_4 \geq P_2 > P_1$. The desired conditions may for instance be produced by connecting the outlet of a blower to hood 210.

FIG. 15 illustrates employment of both the upwardly extended trough 257a of FIG. 13 and the hood 210 of FIG. 14 to provide two zones 218 and 273a which are, respectively, at least partially pressure independent from the drum pool gas space 273 and the remainder of the gas space surrounding the drum, in which pressure $P_1$ prevails. In this embodiment, the appropriate pressure conditions are defined by the expression $P_3 - P_4 < P_2 - P_1$, where $P_1$, $P_2$, $P_3$ and $P_4$ are absolute pressures or pressures based on a common reference. However, preferably: $P_2 > P_1$ and $P_4 \geq P_3$. The desired conditions may be produced by one or more blowers or combinations of blowers and vents, as indicated by the discussions of FIGS. 13 and 14.

These embodiments are useful in the situation where one wishes to obtain enhanced screening capacity as compared to the embodiment of FIGS. 5-7. These embodiments are helpful in improving shower water penetration and recovery. However, these embodiments are also beneficial from the standpoints of improving solids recovery and effluent quality, especially when operating on agglomerated solids. While these embodiments are particularly well suited for operating at high differential pressures, they are useful throughout the entire differential pressure range contemplated for the invention.

As indicated above, the differential pressure may be applied in any desired manner. It has already been shown how blowers may be used for this purpose. The inventors are not aware of any common practice of providing for pressure differences between the air space in a microscreen drum above the drum pool and the ambient, e.g. the air space outside the drum. The inventors are familiar with microscreen units in which portions of the drum are sufficiently ill-fitting so that they would not properly develop the differential pressure with a blower of practical size. To apply the present invention to such units, it would therefore be necessary to provide for or improve upon the sealing off of certain drum components, especially in the ends of the drum and around the edges of the media, so that the drum air space can be pneumatically isolated from the ambient while differential pressure is being applied. When an adequately sealed drum is available, one may, if desired, apply the differential pressure by entraining air in the influent liquid or the shower water.

Reduction of drop-back problems by application of the above-described differential pressure enables an increase in drum speed to levels not previously considered satisfactory. In a conventional microscreen at low drum speed and high solids concentrations in the drum pool, an increase in drum speed produces a near proportional increase in screening capacity per square foot of screen area. However, as the peripheral speed of the screen increases to higher values, the gains in capacity per unit of speed increase taper off. Captured solids fail, in progressively higher proportions, to reach the collection trough, while the flow through a unit area of screen per unit of time decreases. Thus, there is a peak level of drum speed beyond which performance reduces, as illustrated by the curve labelled "WITHOUT" in FIG. 16.

In contrast, with the applied differential pressure, one or more of the drop-back phenomena is reduced in significance. As a result, the drum can be rotated faster before performance tapers off, and a higher peak is attained. This is illustrated by the curve labelled "WITH" in FIG. 16.

Where the liquid undergoing microscreening includes agglomerated or flocculated solids, increases in drum speed—with consequent changes in the drum water velocity vector at the point where the screen leaves the drum pool—may tend to reduce the degree of agglomeration or flocculation. The resultant increase in number of smaller particles present in the drum may increase the overall number of particles escaping through the screen into the effluent per unit of liquid throughput, impairing effluent quality. Where the invention appreciably offsets this trend, it enables increasing the peak-performance speed of a microscreening drum even when operating on agglomerated or flocculated solids. However, the peripheral speeds which are useful with agglomerated or flocculated solids will generally be lower than the peripheral speeds which can be used with discrete solid particles.

Operation of a rotary microscreen unit at increased rotational speed increases the operating torque, bearing load and wear rate of the unit. The present invention, in addition to providing the greater throughput capacity discussed above, can also reduce wear, especially when operating on discrete solids at the higher end of the useful pressure range. The additional buoyancy which the drum has when the air above the drum pool is pressurized and/or when the drum is more deeply immersed reduces the bearing loads, torque and wear accordingly. With this object in mind, one might select an applied differential pressure in the range of about 3 to about 6 inches of water gauge, or from above 6 to about 10 and above.

One might expect that in a conventional microscreen unit, improved performance could be attained by increasing the depth of submergence of the drum, e.g. by raising the level of the tank and drum pools relative to the axis of rotation, and thereby increasing effective screening area. This, unfortunately, causes the drum to emerge from the drum pool at a flatter angle, so that gravity is more effective in prematurely separating captured particles from the screen. Still more significantly, this flatter angle increases the thickness of the exterior water film (32e in FIG. 3b) which is in part responsible for gravitational flow "g". However, the present invention tends to offset gravity, improving screen operation at deeper levels of submergence.

From the foregoing discussion, including the background and theory of invention and the various exemplary embodiments described above, one can see that the invention is applicable to virtually any dilute aqueous suspension of small particles which are subject to drop-back or shower-associated screening efficiency problems. Thus, by way of example and not limitation, the invention is applicable to suspensions of microbiological bodies, e.g. activated sludge, such as are employed in digestion of sewage in waste water treatment plants, including particles which tend to agglomerate or flocculate spontaneously, and those which do not. The invention is also applicable to suspensions of residues from microbiological waste treatment processes. The microbiological bodies and residues differ somewhat, from plant to plant, in the extent to which they suffer from the drop-back problem. It is among the usual activated sludges, e.g. those which are naturally or spontaneously agglomerative, that the drop-back problem appears most common. Depending perhaps on the material of which the screening cloth is made, other particles, e.g. sludges flocculated with trivalent metal salts and/or polyelectrolytes, or certain fibrous particles, may cling better to the screen as it emerges from the drum pool. However, even these more adherent particles are subject to the shower-associated screening efficiency problems mentioned above, so that the invention provides benefits in processing them too.

By way of illustration, and without intention of unnecessarily limiting the invention, a tabulation is set forth below giving some ranges of system parameters within which the invention will most commonly be practiced. In each case where a pressure is expressed as inches of liquid, it will be understood to be the pressure required to support a column of the same liquid being processed through the microscreen, the column height being the number of inches specified in the table. The items listed under the heading "Range B" are the particularly preferred or more commonly encountered values.

| Item | Range A (about) | Range B (about) |
|---|---|---|
| Peripheral Drum Speed (feet per minute) | 30–240 | 90–180 |
| Drum Diameter (feet) | 2–12 | 2–6 |
| Drum Pool Distance above Drum centerline, where "D" is drum diameter in feet. | 0–.4D | 0–.25D |
| Screen Openings Size (Microns) | 5–140 | 20–70 |
| Screen Open Area (percent) | 10–60 | 20–40 |
| ΔH - Hydraulic Pressure Head Across Submerged Portion of Screen (inches of liquid) | 0–18 | 0–10 |
| Applied Differential Pressure (inches of liquid) | 0.1–10 | 0.1–3 |
| Shower Pressure (psig) | 20–160 | 25–100 |
| Influent Solids Concentration (mg/l) | 5–1000 | 15–100 |
| Influent Solids Particle Size (microns) | 5–200 | 20–100 |

The preferred mode of operation of this invention will vary from application to application, and will depend upon economic as well as technical considerations. For example, in cases where the flow is not large, where ample space is readily available, where simplicity of construction is preferred, and/or where effluent suspended solids concentration requirements are not severe, the embodiment of FIG. 11 is frequently preferred.

The following table lists design and operating parameters which would in many instances be appropriate:

| Liquid Handled | Activated sludge plant effluent |
|---|---|
| Ave. influent suspended solids concentration mg/l | 25 |
| Ave. effluent suspended solids concentration mg/l | 12 |
| Typical drum speed | 120 fpm |
| Drum diameter, ft. | 5 |
| Screen opening - microns | 27 |
| Screen open area | 21% |
| Average ΔH inches w.g. | 6" |
| Max ΔH inches w.g. | 12" |
| Applied max. drum pressure inches w.g. | .3 |
| Low and High Shower Pressure psi | 35-120 |
| Drum Pressure - shower | As in FIGS. 11, 11A, 12 |
| Pressure control system | |
| Outfall weir crest elev. 85-(FIG. 5) | 1" above centerline* |
| Drum seal level 193 (FIG. 11A) | 8" above centerline* |
| High pressure float switch 177a of FIG. 11a set to operate with liquid at | 12.5" above centerline* |
| Low pressure float switch 175a of FIG. 11a set to operate with liquid at | 8" above centerline* |
| Crest of Solids collection trough 55 (FIG. 7) | 15" above centerline* |
| Screen capacity GPM/ft. of width | 150 |

*Drum centerline

On the other hand, assuming the liquid and solids are the same, but that flows are large, space is at a premium, precision construction is acceptable, and/or that effluent suspended solids concentration requirements are stringent, the embodiment of FIG. 13 may be preferred. In this instance the following design and operating parameters would be frequently be appropriate:

| | |
|---|---|
| Ave. influent suspended solids concentration mg/l | 25 |
| Ave. effluent suspended solids concentration mg/l | 7 |
| Typical drum speed | 170 fpm |
| Drum diameter, ft. | 4 |
| Screen opening - microns | 27 |
| Screen open area | 21% |
| Average ΔH, inches w.g. | 6" |
| Max. ΔH | 12" |
| $P_1$ FIG. 13 | Atm. |
| $P_2$ FIG. 13 | +1.0" w.g. |
| $P_3$ FIG. 13 | −0.2" w.g. |
| Low and High Shower Pressure, psi | 35-120 |
| Shower Pressure control | As in FIG. 12 |
| Drum pressure control | Continuous operation with manual throttle and vent |
| Outfall weir crest elev. 85-(FIG. 5) | 1" above centerline* |
| Drum seal level 193 (FIG. 11a) | 8" above centerline* |
| High pressure float switch 177a of FIG. 11a set to operate with liquid at | 12.5" above centerline* |
| Low pressure float switch 175a of FIG. 11a set to operate with liquid at | 8" above centerline* |
| Top of solids collection trough 222 FIG. 13 | 21" above centerline* |
| Screen capacity GPM/ft. of width | 250 |

*Drum centerline

EXAMPLES

The following examples illustrate the invention and compare it to conventional systems and their operation. The microscreen unit was a Sanitaire model 5×10 microscreen unit having a 5 ft. in diameter×10 ft. in length drum fitted throughout its peripheral surface with nylon cloth having a 462×462 square weave and 25 micron openings, supported in the manner described above, with the expanded metal toward the inside of the drum. The showers were #3 Lodding self-cleaning nozzles delivering 3-3.5 GPM per nozzle and spaced longitudinally at 6 inch intervals, 4 inches above the apex of the drum and fed by a 60-70 GPM pump operating at a pressure of 60-80 psig. The drum pool depth was approximately 41 inches. The blower was a Dayton model 2C820 rated for an output of 475 cfm, at 2" $H_2O$ head with an outlet duct 4 inches in diameter and equipped with a weight loaded relief valve to the atmosphere from the line between the blower and the air outlet in the drum, to control pressure in the drum. The blower was either off or operated continuously as indicated by the drum pressure readings given below. The solids were activated sludge particles in waste water. Other system parameters and operating results are given in the table below:

TABLE I

| Example Number | 1 | 2 | 3 | 4 |
|---|---|---|---|---|
| Influent flow G.P.M. | 485 | 596 | 461 | 461 |
| Drum speed f.p.m. | 118.9 | 118.9 | 86.1 | 84.7 |
| Shower pressure PSI | 60 | 60 | 80 | 80 |
| Shower Water Recovery - GPM | 41 | 33.7 | 41 | 36.1 |
| % Recovery of shower water | 65 | 53.5 | 55.4 | 48.8 |
| ΔH - in. $H_2O$ | 3.5 | 4.375 | 6.0 | 3.5 |
| Drum gas Pressure - in. $H_2O$ | 0 | 2.25 | 0 | 2.25 |
| Influent suspended solids | 52 | 91 | 77.6 | 95 |
| Effluent suspended solids | 8.1 | 22.2 | 14.6 | 20.6 |
| Net suspended solids | 43.9 | 68.8 | 63.0 | 74.4 |
| Drum water suspended solids | 533 | 356 | 400 | 241 |
| Backwash suspended solids | 372 | 2420 | 716 | 1170 |
| Material balance $\frac{out}{in}$ | .75 | 1.74 | .99 | 1.16 |
| Apparent solids loading $\frac{mg^*}{cm^2}$ | .073 | .140 | .137 | .164 |
| Liquid load machine $\frac{cm^3}{cm^2}$ | 1.66 | 2.04 | 2.18 | 2.22 |
| Estimated screen capacity at ΔH = 6" and at net suspended solids removal of 50 mg/l | 570 | 799 | 517 | 705 |

Note: All suspended solids are in mg/l.
*Computed on the basis of solids removed from influent.

Another example involved a 5×12, 5 ft. in. diameter×12 ft. long Sanitaire screen fitted with polyester cloth having a 421×421 square weave and 27 micron openings, supported in the same manner as in the previous example. The same shower type, spacing, and location were employed, and the volume of flow was approximately 80 GPM at approximately 80 psi pressure. The drum pool depth was about 40 inches. The drum pressure was applied thru a Grainger Cat. No. 1C180 blower which was capable of delivering 60 CFM of air with open discharge and developing a maximum pressure of 0.6 in Wg with closed discharge, at a maximum power consumption of 36 watts. (1977 cost $11.25.) Drum pressure was controlled by venting a variable portion of the blower output to atmosphere, and directing the remainder to the drum, which was sealed. The liquid being processed was effluent from an activated sludge wastewater treatment plant. The following results were obtained:

| Example Number | 5 | 6 | 7 |
|---|---|---|---|
| Influent flow GPM | 583 | 964 | 816 |
| Drum speed fpm | 90 | 90 | 90 |
| Shower Pressure psi | 80 | 80 | 80 |
| ΔH inches H$_2$O | 5.3 | 7.3 | 4.5 |
| Drum Gas Pressure inches H$_2$O | 0 | .1 | .5 |
| Influent SS mg/l | 48 | 52 | 46 |
| Effluent SS mg/l | 24 | 25 | 26 |
| Net SS mg/l | 24 | 27 | 20 |
| Estimated screen capacity at ΔH = 6" and at net suspended solids removal of 24 mg/l GPM | 614 | 942 | 841 |

The estimates of screen capacity were obtained through application of empirically derived relationships, obtained on the same screens handling the same type influent as follows:

$$\text{Screen capacity at fixed speed and fixed shower and drum pressure.} = \frac{K \Delta H^{.42}}{SS^{.5}}$$

Where K is constant and net suspended solids removal (SS) represents the arithmetic difference between influent and effluent suspended solids concentration. It should be noted that the data in the above experimenrts was obtained while operating with and without drum pressure at the same drum speed. However, as has been explained previously, the invention enhances the practicality of operating at higher drum speeds, leading to even greater capacity. Accordingly, examples constructed to demonstrate the maximum potential of the invention, comparing slow speed/no pressure operation with higher speed/pressurized operation, could show an even larger increase in through put than the above examples.

The foregoing text gives some illustrations of the invention. However, many modifications can be made without departing from the spirit of the invention, and the following claims should be interpreted in light of this fact.

What is claimed is:

1. In a microscreening process in which microscreen throughput capacity is impaired by drop back, the improved method of microscreening which comprises:

(A) providing a microscreen unit having a tank with stationary walls for containing a tank pool, a drum mounted for rotation in said tank for containing a drum pool, a screening medium which defines the peripheral surface of the drum and provides communication of liquid between said drum pool and tank pool, back flush spray means mounted above and outside the screening medium and collecting means within the drum beneath the back flush spray means;

(B) feeding as influent into said drum pool a dilute liquid suspension containing about 5 to 1,000 milligrams per liter of suspended particles;

(C) during said feeding of influent, controlling the upper surface of the drum pool at a level, relative to the tank pool level, corresponding to a hydraulic pressure head ΔH across the submerged portion of the screen of up to about 18 inches of said liquid, said level not exceeding about 0.4 D above the drum center line, where D is the drum diameter, to maintain a gas space above said drum pool surface;

(D) screening said suspension by passing liquid therefrom through said medium and depositing said suspended particles on the interior of said drum at a solids loading of up to about 2 milligrams per cm$^2$ while rotating said drum at a peripheral speed in the range of about 30 to 240 feet per minute;

(E) as the screen rotates, transporting said deposited particles on the inside of the screen over that portion of the gas space which extends from the location where said peripheral surface emerges from the drum pool to a location where it passes over said collecting means;

(F) maintaining a pressure differential in the range of about 0.1 to 10 inches of liquid gauge across the medium, which is positive on the inside relative to the outside, in a portion of the medium which is traversing said portion of the gas space, said pressure differential being sufficient to substantially reduce the quantity of particles which drop back into said drum pool from said screening medium; and (G) directing a spray of back flush fluid from outside the medium through said pheripheral surface over said collecting means at a pressure of about 20–160 psig for dislodging particles from said screening medium and directing the dislodged particles, along with liquid added thereto by said back flush spray, into said collecting means.

2. Process in accordance with claim 1 wherein said liquid suspension is a waste water treatment plant effluent containing microbiological particles.

3. Process in accordance with claim 1 wherein the portion of the screening medium to which the pressure differential is applied includes the location at which the screening medium emerges from the drum pool.

4. Process in accordance with claim 1 wherein the portion of the screening medium to which the pressure differential is applied includes the location at which the screening medium emerges from the drum pool and the entire portion of the screening medium which extends from said location to where the screening medium passes over the collecting zone.

5. Process in accordance with claim 1 wherein the applied pressure differential is increased in response to higher operating loads in said drum and reduced in response to lower operating loads in said drum.

6. Process in accordance with claim 1 wherein the applied pressure differential is increased in response to higher liquid levels in said drum and reduced in response to lower liquid levels in said drum.

7. Process in accordance with claim 1 wherein the pressure differential is applied only during peak loads on said microscreen.

8. Process in accordance with claim 1 wherein the solids loading is up to about 1 milligram per cm$^2$ and the pressure differential is in the range of about 0.1 to 6 inches of liquid gauge.

9. Process in accordance with claim 1 wherein the applied pressure differential is more than six inches and up to about ten inches of liquid gauge.

10. Process in accordance with claim 1 wherein the pressure differential is less than that required to break through segments of liquid film extending across openings in said portion of the screening medium.

11. Process in accordance with claim 1 wherein the back flush spray pressure is increased in response to higher loads in said drum and decreased in response to lower operating loads in said drum.

12. Process in accordance with claim 1 wherein the back flush spray pressure is increased in response to higher liquid levels in said drum and reduced in response to lower liquid levels in said drum.

13. Process in accordance with claim 1 wherein said back flush spray is operated at increased pressure during at least a substantial portion of the time when said pressure differential is increased, and said back flush spray is operated at decreased pressure during at least a substantial portion of the time when said pressure differential is reduced.

14. Process in accordance with claim 1 wherein the applied pressure differential is applied discontinuously during rotation of said drum, said back flush spray is operated at increased pressure during at least a substantial portion of the time when said pressure differential is applied, and said back flush spray is operated at decreased pressure during at least a substantial portion of the time when said pressure differential is not applied.

15. Process in accordance with claim 1 wherein a zone is provided in and adjacent to that portion of said medium traversed by the back flush liquid, which provides pressure outside the medium which is greater than or equal to the pressure inside the medium.

16. Process in accordance with claim 1 wherein a zone is provided in the drum and adjacent to that portion of the medium traversed by the back flush liquid spray, which zone is at a lower pressure than that of the gas space.

17. Process in accordance with claim 1, wherein a zone is provided outside the drum and adjacent to that portion of the medium traversed by the back flush liquid spray, which zone is at a higher pressure than the atmosphere surrounding the drum.

18. Process in accordance with claim 1, wherein said screening medium has openings of about 5–140 microns.

19. Process in accordance with claim 1, wherein said screening medium has openings of about 5–140 microns, the solids loading is up to about 1 milligram per cm$^2$ and the pressure differential is in the range of about 0.1 to 6 inches of liquid gauge.

20. In a microscreening process in which microscreen throughput capacity is impaired by drop back, the improved method of microscreening which comprises:
(A) providing a microscreen unit having a tank with stationary walls for containing a tank pool, a drum mounted for rotation in said tank for containing a drum pool, a screening medium having an open area of about 10–60% which defines the peripheral surface of the drum and provides communication of water between said drum pool and tank pool, back flush spray means mounted above and outside the screening medium and collecting means within the drum beneath the back flush spray means;
(B) feeding as influent into said drum pool a dilute aqueous suspension containing about 5 to 1,000 milligrams per liter of suspended microbiological particles;
(C) during said feeding of influent, controlling the upper surface of the drum pool at a level, relative to the tank pool level, corresponding to a hydraulic pressure head $\Delta H$ across the submerged portion of the screen of up to about 10 inches of water, said level not exceeding about 0.4D above the drum center line, where D is the drum diameter, to maintain a gas space above said drum pool surface;
(D) screening said suspension by passing water therefrom through said medium and depositing said suspended microbiological particles on the interior of said drum at a solids loading of up to about 1 milligram per cm$^2$ while rotating said drum at a peripheral speed in the range of about 30 to 240 feet per minute;
(E) as the screen rotates, transporting said deposited particles on the inside of the screen over that portion of the gas space which extends from the location where said peripheral surface emerges from the drum pool to a location where it passes over said collecting means;
(F) maintaining a pressure differential in the range of about 0.1 to 6 inches of liquid gauge across the medium, which is positive on the inside relative to the outside, in a portion of the medium which is traversing said portion of the gas space, said pressure differential being sufficient to substantially reduce the quantity of particles which drop back into said drum pool from said screening medium, and less than that required to break through segments of water film extending across openings in said portion of the medium; and
(G) directing a spray of back flush water from outside the medium through said peripheral surface over said collecting means at a pressure of about 20–160 psig for dislodging particles from said screening medium and directing the dislodged particles, along with water added thereto by said back flush spray, into said collecting means.

21. In an apparatus for microscreening dilute liquid suspensions of suspended particles, including: a stationary walled enclosure for containing a tank pool; a drum, mounted for rotation in said tank pool, said drum having on its peripheral surface a screening medium, for containing a drum pool of said liquid suspension and an overlying drum gas space and for providing communication of liquid between said drum pool and tank pool; said drum being connected with means for providing on the inside of said screening medium a solids loading of particles of up to about 2 mg/cm$^2$ per pass, for maintaining the upper surface of the drum pool at a level, relative to the tank pool level, corresponding to a hydraulic pressure head $\Delta H$ across the submerged portion of the screen in the range of up to about 18 inches of said liquid, and for maintaining the level of the drum pool at a level of up to about 0.4D above the drum centerline, where D is the drum diameter, for maintaining a gas space in said drum above said drum pool surface; and said drum being connected with means for rotating said drum at a peripheral speed in the range of about 30–240 feet per minute to cause successive portions of the medium to emerge from said drum pool bearing said particles; the improvement comprising the combination of:
particle collection means within the upper portion of the drum;
back flush spray means outside the drum, positioned over the particle collection means, for discharging back flush spray liquid through the medium at a pressure of about 20 to 160 psig, for dislodging particles from the medium and for introducing a mixture of said particles and added back flush spray liquid into said collection means; and
means, including pressure producing means or gas exhausting means, in communication with said drum, for maintaining across a portion of said medium between where said medium emerges from the drum pool and where it passes over the solids collecting means, a pressure differential in the range of about 0.1 to 10 inches of water gauge which is positive on the inside of the medium relative to the outside thereof, and which is sufficient to reduce the drop back of particles from said portion into said pool.

22. Apparatus in accordance with claim 21 wherein the portion of the screening medium to which the pressure differential is applied includes the location at which the screening medium emerges from the drum pool.

23. Apparatus in accordance with claim 21 wherein the portion of the screening medium to which the pressure differential is applied includes the location at which the screening medium emerges from the drum pool and the entire portion of the screening medium which extends from said location to where the screening medium passes over the collecting zone.

24. Apparatus in accordance with claim 21 wherein the pressure producing means or gas exhausting means is connected to and is operative in response to means for sensing the load in said microscreen apparatus, for increasing the applied pressure differential in response to higher operating loads in said apparatus and for reducing said pressure differential in response to lower operating loads in said apparatus.

25. Apparatus in accordance with claim 21 wherein the pressure producing means or gas exhausting means is connected to and is operative in response to means for sensing the liquid level in said drum, for increasing the applied pressure differential in response to higher liquid levels in said drum and for reducing said pressure differential in response to lower liquid levels in said drum.

26. Apparatus in accordance with claim 21 wherein the pressure producing means or gas exhausting means is connected to and is operative in response to means for sensing the load in said microscreen apparatus, and for applying said pressure differential only during peak loads on said microscreen.

27. Apparatus in accordance with claim 21 wherein the pressure producing means or gas exhausting means is for applying a pressure differential which is less than that required to break through segments of water film extending across openings in said portion of the screening medium.

28. Apparatus in accordance with claim 21 wherein said back flush spray means is connected to and is operative in response to means for sensing the load in said microscreen apparatus, for increasing the back flush spray pressure in response to higher operating loads in said apparatus and for decreasing said back flush spray pressure in response to lower operating loads in said apparatus.

29. Apparatus in accordance with claim 21 wherein said back flush spray means is connected to and is operative in response to means for sensing the liquid level in said drum, for increasing the back flush spray pressure in response to higher liquid levels in said drum and for decreasing said back flush spray pressure in response to lower liquid levels in said drum.

30. Apparatus in accordance with claim 21 wherein means are provided for operating said back flush spray at increased pressure during at least a substantial portion of the time when said pressure differential is increased, and operating said back flush spray at decreased pressure during at least a substantial portion of the time when said pressure differential is reduced.

31. Apparatus in accordance with claim 21 wherein means are provided for applying the pressure differential discontinuously during rotation of said drum, operating said back flush spray at increased pressure during at least a substantial portion of the time when said pressure differential is applied, and operating said back flush spray at decreased pressure during at least a substantial portion of the time when said pressure differential is not applied.

32. Apparatus in accordance with claim 21 including an enclosure adjacent to the screening medium and defining a region in which back flush liquid traverses the screening medium, said enclosure being connected with means for controlling the pressure in said region, for maintaining the pressure outside the screening medium relatively greater than or equal to the pressure inside the medium.

33. Apparatus in accordance with claim 21 including an enclosure in the drum adjacent to that portion of the medium traversed by the backflush liquid spray, and means connected with said enclosure for maintaining said enclosure at a pressure which is relatively lower than the pressure in the gas space.

34. Apparatus in accordance with claim 21 including an enclosure outside the drum and adjacent to that portion of the medium traversed by the backflush liquid spray, and means connected with said enclosure for maintaining said enclosure at a pressure which is relatively higher than the atmosphere surrounding the drum.

35. Apparatus in accordance with claim 21, wherein said screening medium has openings of about 5-140 microns.

36. Apparatus in accordance with claim 21, wherein said screening medium has openings of about 5-140 microns, the solids loading is up to about 1 milligram per $cm^2$ and the pressure differential is in the range of about 0.1 to 6 inches of liquid gauge.

37. In an apparatus for microscreening dilute liquid suspensions of suspended particles including: a stationary walled tank for containing a tank pool; a drum, mounted for rotation in said tank pool, said drum having on its peripheral surface a screening medium with an open area of about 10-60% for containing a drum pool of said liquid suspension and an overlying drum gas space and for providing communication of liquid between said drum pool and tank pool; said drum being connected with means for providing on the inside of said screening medium a solids loading of particles of up to about 1 mg/$cm^2$ per pass, for maintaining the upper surface of the drum pool at a level, relative to the tank pool level, corresponding to a hydraulic pressure head $\Delta H$ across the submerged portion of the screen in the range of up to about 10 inches of said liquid, and for maintaining the level of the drum pool at a level of up to about 0.4D above the drum centerline, where D is the drum diameter, for maintaining a gas space in said drum above said drum pool surface; and said drum being connected with means for rotating said drum at a peripheral speed in the range of about 30-240 feet per minute to cause successive portions of the medium to emerge from said drum pool bearing said particles, the improvement comprising the combination of:

particle collection means within the upper portion of the drum;

back flush spray means outside the drum, positioned over the particle collection means, for discharging back flush spray liquid through the medium at a pressure of about 20 to 160 psig, for dislodging particles from the medium and for introducing a mixture of said particles and added back flush spray liquid into said collection means; and means, including pressure producing means or gas exhausting means, in communication with said drum, for maintaining across a portion of said medium between where said medium emerges from the drum pool and where it passes over the solids collecting means, a pressure differential in the range of about 0.1 to 6 inches of water gauge which is positive on the inside of the medium relative to the outside thereof, and which is sufficient to reduce the drop back of particles from said portion into said pool.

* * * * *